(12) United States Patent
Hamilton

(10) Patent No.: US 11,869,138 B2
(45) Date of Patent: *__Jan. 9, 2024__

(54) LIGHT FIELD VOLUME RENDERING SYSTEM AND METHODS

(71) Applicant: Avalon Holographics Inc., St. John's (CA)

(72) Inventor: Matthew Hamilton, St. John's (CA)

(73) Assignee: Avalon Holographics Inc., St. John's (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/067,126

(22) Filed: Dec. 16, 2022

(65) Prior Publication Data

US 2023/0123552 A1 Apr. 20, 2023

Related U.S. Application Data

(63) Continuation of application No. 17/240,875, filed on Apr. 26, 2021, now Pat. No. 11,562,530.

(60) Provisional application No. 63/015,929, filed on Apr. 27, 2020.

(51) Int. Cl.
*G06T 15/50* (2011.01)
*G06T 15/06* (2011.01)
*G06T 15/08* (2011.01)

(52) U.S. Cl.
CPC ............ *G06T 15/503* (2013.01); *G06T 15/06* (2013.01); *G06T 15/08* (2013.01)

(58) Field of Classification Search
CPC ........ G06T 15/06; G06T 15/08; G06T 15/503
See application file for complete search history.

(56) References Cited

U.S. PATENT DOCUMENTS

| 8,736,675 B1 * | 5/2014 | Holzbach ............. H04N 13/305 348/42 |
| 2006/0114254 A1 * | 6/2006 | Day ........................ G06T 15/08 345/424 |

(Continued)

OTHER PUBLICATIONS

Mäkinen, Jani, Erdem Sahin, and Atanas Gotchev. "Speckle reduction method for image-based coherent stereogram generation." Optics express 26.5 (2018): 5381-5394. (Year: 2018).*

*Primary Examiner* — Daniel F Hajnik

(57) ABSTRACT

A system and method for volume rendering a light field, wherein the light field data is subjected to a layering scheme introducing a partitioning of the hogels into subsets. Each subset corresponding to a sub-volume of the layer volume, corresponds to the sub-region of the layer. Novel partitioning of the data combined with an efficient local memory caching technique, plenoptic downsampling strategies to reduce memory bandwidth requirements and volume rendering algorithm to produce a rendered light field image. A reduction in the total number of samples required can be obtained while still maintaining the quality of the resulting image. A method is also provided to order memory accesses aligned with ray calculations in order to maximize access coherency. Real-time layered scene decomposition can be combined with surface rendering method to create a hybrid real-time rendering method that supports rendering of scenes containing superimposed volumes and surfaces.

18 Claims, 10 Drawing Sheets

(56) References Cited

U.S. PATENT DOCUMENTS

| | | | |
|---|---|---|---|
| 2007/0165026 A1* | 7/2007 | Engel | G06T 15/08 345/424 |
| 2011/0228040 A1* | 9/2011 | Blanche | G03H 1/268 348/E13.001 |
| 2015/0296203 A1* | 10/2015 | Lucente | G03H 1/0808 348/41 |
| 2018/0293711 A1 | 10/2018 | Vogels et al. | |

* cited by examiner partitioning a three-dimensional description of a scene containing volume data into layers, each layer having an associated light field and at least one slab volume, each slab volume having an associated hogel subset such that all rays associated with the hogel subset intersect the slab volume
60

volume rendering the light field associated with each layer using the volume data contained within the layer such that volume rendering calculations for all rays in the hogel subset are performed for rays intersecting the slab volume
62

caching the volume data intersecting the corresponding slab volume and storing the data in a local store cache memory
64

blending the rendered light fields associated with each layer into a single output light field image
66

FIG. 5 partitioning a three-dimensional description of a scene comprising surface data elements and volume data into a plurality layers, each layer having an associated light field and sampling scheme
68 further partitioning at least one of the plurality of layers into a plurality of subsections, each subsection having an associated light field and sampling scheme, wherein each subsection location is determined in accordance with geometry of at least a portion of an object represented in the scene
70 for each layer and each subsection, rendering a set of pixels comprising extra-pixel information using the surface data contained within each layer and each subsection in accordance with the sampling scheme to generate a sampled light field
72 reconstructing the sampled light field for each layer and subsection using the set of pixels
74 volume rendering the light field associated with each layer using the volume data contained within the layer
76 blending the reconstructed sampled light field and volume rendered light fields associated with each layer and subsection into a single output light field image
78

FIG. 7 partitioning a three-dimensional scene containing volume data elements into layers, each layer having an associated light field and a sampling scheme, where each light field is comprised of one or more hogel subsets, where each hogel subset and the associated layer defines a sub-volume of the layer called the slab volume
80 volume rendering the light field associated with each layer using the volume data contained within the layer in accordance with the sampling scheme
82 upscaling and blending the rendered light fields associated with each layer into a single output light field image
84

FIG. 8

LIGHT FIELD VOLUME RENDERING SYSTEM AND METHODS

CLAIM OF PRIORITY

This application claims priority to U.S. Patent Application Ser. No. 63/015,929, filed on Apr. 27, 2020, and is a continuation of U.S. patent application Ser. No. 17/240,875 filed on 26 Apr. 2021, the contents of both of which are incorporated herein by reference in their entirety.

FIELD OF THE INVENTION

The present disclosure relates to light field volume rendering for rendering image and light field data, which may be combined with rendering, data compression and decompression systems, and methods for the provision of interactive multi-dimensional content at a light field display.

BACKGROUND OF THE INVENTION

Techniques for volume rendering light fields for volume data visualization on light field displays are desirable. Volume rendering a light field offers the opportunity to achieve a new level of convincing immersive experiences. Volume rendering is particularly useful in medical imaging visualization, seismic visualization, fluid dynamics, and industrial inspection. Specifically, within the medical field, the ability to view three-dimensional (3D) imaging resulting from scans such as magnetic resonance imaging (MRI), for example, allows for in depth understanding of human anatomy and facilitates efficient diagnostics. Furthermore, when this visualization capability can be performed at real-time interactive rates, more detailed, efficient and accurate diagnostics can be performed using larger more detailed datasets that can also incorporate a temporal element.

In terms of real-time computer graphics, 3D scenes are typically represented as a set of surfaces using e.g. polygons, points, splines. Real-time surface rendering techniques known in the art generally only synthesize images of a scene where light is reflected. One method of representation that enables modelling beyond surface reflections involves using volumetric representations coupled with volume rendering techniques. However, this generally requires many rays and many samples of the volume data. As volume rendering is computationally intensive, accelerated methods that are less computationally expensive and preserve image quality are desired for volume rendering light fields.

Usable light field displays have been said to require at least billions of pixels to achieve acceptable quality. Light field rendering thus requires rendering orders of magnitude more pixels or rays than conventional two-dimensional (2D) image rendering. Thus, for light field volume rendering, it can be observed that many more rays are required. Given the inherent intersection/overlap between the many rays in a light field, in light field volume rendering rays may be observed to be loading many of the same samples repeatedly. However, a coherency scheme, that exploits this inherent reuse, is less obvious.

A ray-casting method, as described by Stegmaier et al., seems to be the preferred method, as it allows for increased control of sampling and runs at real-time rates on modern GPUs. It is commonly observed that a modern GPU implementation of volume rendering has a dynamic random-access memory (DRAM) memory bandwidth bottleneck, as the ray casting procedure requires many samples to be taken of the volume data set. Voxels from the volume data are accessed by the rendering algorithm multiple times. If all accesses involve a read from DRAM, memory bandwidth and latency can become a serious performance bottleneck.

There remains a need for a light field volume rendering system and method which can provide good resolution at acceptable working speeds.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

The present invention relates generally to a method of light field volume rendering of 3D image data. The present disclosure describes an algorithm requiring fewer samples of the volume data, which contributes directly to reducing the bandwidth-based bottlenecks associated with 3D volume rendering and provides a more rapid and less computationally intensive rendering process. It is also an object of the present disclosure to describe a method that illustrates how to use caching effectively for light field volume rendering, in order to further alleviate slow memory-based bottlenecks during rendering calculations.

According to an aspect there is provided a computer-implemented method for light field volume rendering of a scene in a computer system comprising: partitioning a three-dimensional description of a scene containing volume data into layers, each layer having an associated light field and at least one slab volume, each slab volume having an associated hogel subset such that all rays associated with the hogel subset intersect the slab volume; volume rendering the light field associated with each layer using the volume data contained within each layer such that volume rendering calculations are performed for rays in the hogel subset to provide rendered light fields; caching the volume data intersecting the corresponding slab volume and storing the volume data in a local store cache memory; and blending the rendered light fields associated with each layer into a single output light field image.

Embodiments can include one or more of the following features, which may be combined in any permutation or combination.

In an embodiment of the method, only a fraction of the volume data is cached.

In another embodiment, the method further comprises synchronizing the volume rendering calculations performed for rays in the hogel subset at their initial entrance into the slab.

In another embodiment of the method, at least one layer has more than one slab volume.

In another embodiment of the method, reconstruction calculations are performed on the rays intersecting the slab volume, the rays intersecting the slab volume associated with re-sampling points located along the ray path by selectively accessing a set of volume elements from the local store cache memory.

In another embodiment of the method, the hogel subsets are sized to take advantage of ray sample overlap in the hogels in the subset.

In another embodiment of the method, the volume rendering calculations corresponding to each hogel subset are synchronized as they intersect the corresponding slab volume.

In another embodiment, method is used in a real-time rendering system.

In another aspect there is provided a computer-implemented light field image rendering method comprising of the steps of: partitioning a three-dimensional description of a scene comprising surface data elements and volume data into a plurality of layers, each layer having an associated light field and sampling scheme; further partitioning at least one of the plurality of layers into a plurality of subsections, each subsection having an associated light field and sampling scheme, wherein each subsection location is determined in accordance with geometry of at least a portion of an object represented in the scene; for each layer and each subsection, rendering a set of pixels comprising extra-pixel information using the surface data contained within each layer and each subsection in accordance with the sampling scheme to generate a sampled light field; reconstructing the sampled light field for each layer and subsection using the set of pixels; volume rendering the light field associated with each layer using the volume data contained within the layer; and blending the reconstructed sampled light field and volume rendered light fields associated with each layer and subsection into a single output light field image.

Embodiments can include one or more of the following features, which may be combined in any permutation or combination.

In an embodiment of the method, the sampling scheme comprises a binary matrix associated with each layer and a mapping function to map each layer.

In another embodiment of the method, each light field associated with each layer is comprised of one or more hogel subsets, wherein each hogel subset and its associated layer defines a slab volume which is a sub-volume of the layer, and wherein the method further comprises: synchronizing the volume rendered calculations related to rays associated with each layer; caching the volume data intersecting each corresponding slab volume; and volume rendering the rays in each hogel subset as the rays intersect the slab volume.

In another embodiment of the method, only a fraction of the volume data is cached.

In another embodiment of the method, at least one layer has more than one slab volume.

In another embodiment of the method, the hogel subsets are sized to take advantage of a ray sample overlap amongst the hogels in the subset.

In another embodiment of the method, all volume rendering calculations that correspond to a hogel subset are synchronized as they intersect the corresponding slab volume.

In another embodiment, the method is used in a real-time rendering system.

In another aspect there is provided a method for light field volume rendering of a scene in a computer system, comprising: partitioning a three-dimensional scene containing volume data elements into layers, each layer having an associated light field and a sampling scheme, wherein each light field is comprised of one or more hogel subsets, and each hogel subset and the layer and associated light field defines a slab volume comprising a sub-volume of the layer; volume rendering the light field associated with each layer using the volume data contained within the layer in accordance with the sampling scheme to provide a plurality of rendered light fields; and upscaling and blending the rendered light fields associated with each layer into a single output light field image.

Embodiments can include one or more of the following features, which may be combined in any permutation or combination.

In an embodiment of the method, the sampling scheme comprises a binary matrix associated with each layer and a mapping function to map each layer.

In another embodiment of the method, the volume data intersecting the slab volume is cached.

In another embodiment of the method, only a portion of the volume data intersecting the slab volume is cached.

In another embodiment of the method, at least one layer has more than one slab volume.

In another embodiment of the method, the hogel subsets are sized to take advantage of ray sample overlap amongst the hogels in the subset.

In another embodiment of the method, the method is used in a real-time rendering system.

In another aspect there is provided a system for performing accelerated volume rendering of a scene in a computer system, said system comprising: a system memory for storing volume data; a processor device operatively coupled with the system memory configured to: partition a three-dimensional description of a scene containing volume data into layers, each layer having an associated light field and at least one slab volume, each slab volume having an associated hogel subset such that all rays associated with the hogel subset intersect the slab volume; volume render the light field associated with each layer using the volume data contained within each layer such that volume rendering calculations are performed for rays in the hogel subset and for rays intersecting the slab volume to provide rendered light fields; cache the volumetric light field data intersecting the corresponding slab volume and storing the volumetric light field data in a local store cache memory; and blend the rendered light fields associated with each layer into a single output light field image.

Embodiments can include one or more of the following features, which may be combined in any permutation or combination.

In an embodiment of the system, only a fraction of the volume data is cached.

In another embodiment, the system memory is further configured to synchronize the volume rendering calculations related to rays within a hogel subset.

In an embodiment of the system, at least one layer has more than one slab volume.

In an embodiment of the system, reconstruction calculations are performed on rays intersecting the slab volume by selectively accessing a set of volume elements from the local store cache memory.

In an embodiment of the system, the hogel subsets are sized to take advantage of ray sample overlap amongst the hogels in the subset.

In an embodiment of the system, volume rendering calculations that correspond to a hogel subset are synchronized as the rays associated with the hogel subset intersect the slab volume.

In an embodiment, the system is for use in a real-time rendering system.

In another aspect there is provided a system for performing accelerated volume rendering of a scene in a computer system, said system comprising: a system memory for storing volume data; a processor device operatively coupled with the system memory configured to: partition a three-dimensional description of a scene comprising surface data elements and volume data into a plurality layers, each layer having an associated light field and sampling scheme; further partition at least one of the plurality of layers into a plurality of subsections, each subsection having an associated light field and sampling scheme, wherein each subsection location is determined in accordance with geometry of at least a portion of an object represented in the scene; for each layer and each subsection, render a set of pixels comprising extra-pixel information using surface data contained within each layer and each subsection in accordance with the sampling scheme to generate a sampled light field; reconstruct the sampled light field for each layer and subsection using the set of pixels; volume render the light field associated with each layer using the volume data contained within the layer; and blend the reconstructed sampled light field and volume rendered light fields associated with each layer and subsection into a single output light field image.

Embodiments can include one or more of the following features, which may be combined in any permutation or combination.

In an embodiment of the system, the sampling scheme comprises a binary matrix associated with each layer and a mapping function to map each layer.

In another embodiment of the system, each light field associated with a layer is comprised of one or more hogel subsets, where each hogel subset and the associated layer defines a sub-volume of the layer called the slab volume and further comprises: synchronizing volume rendering calculations related to rays; caching the volume data intersecting the corresponding slab volume; and volume rendering calculations for all rays in the hogel subset are performed as they intersect the slab volume.

In another embodiment of the system, only a fraction of the volume data is cached.

In another embodiment of the system, at least one layer has more than one slab volume.

In another embodiment of the system, the hogel subsets are sized to take advantage of ray sample overlap amongst the hogels in the subset.

In another embodiment of the system, volume rendering calculations that correspond to each hogel subset are synchronized as the rays associated with the hogel subset intersect the slab volume.

In another embodiment, the system is used in a real-time rendering system.

In another embodiment there is provided a system for performing accelerated volume rendering of a scene in a computer system, said system comprising: a system memory for storing volume data; a processor device operatively coupled with the system memory configured to: partition a three-dimensional scene containing volume data elements into layers, each layer having an associated light field and a sampling scheme, where each light field is comprised of one or more hogel subsets and each hogel subset and layer defines a slab volume comprising a sub-volume of the layer; volume render the light field associated with each layer using the volume data contained within the layer in accordance with the sampling scheme; and upscale and blend the rendered light fields associated with each layer into a single output light field image.

Embodiments can include one or more of the following features, which may be combined in any permutation or combination.

In an embodiment of the system, the sampling scheme comprises a binary matrix associated with each layer and a mapping function to map each layer.

In another embodiment of the system, the volume data of the hogel subset intersecting the slab volume is cached.

In another embodiment of the system, only a fraction of the volume data of the hogel subset intersecting the slab volume is cached.

In another embodiment of the system, at least one layer has more than one slab volume.

In another embodiment of the system, the hogel subsets are sized to take advantage of a ray sample overlap amongst the hogels in the subset.

BRIEF DESCRIPTION OF THE DRAWINGS

These and other features of the invention will become more apparent in the following detailed description in which reference is made to the appended drawings.

FIG. 5: illustrates a flow diagram of a light field volume rendering method.

FIG. 7: illustrates a flow diagram of an alternative embodiment of the light field volume rendering method.

FIG. 8: illustrates a flow diagram of an alternative embodiment of the light field volume rendering method.

DETAILED DESCRIPTION OF THE INVENTION

Definitions

Figure 1A:
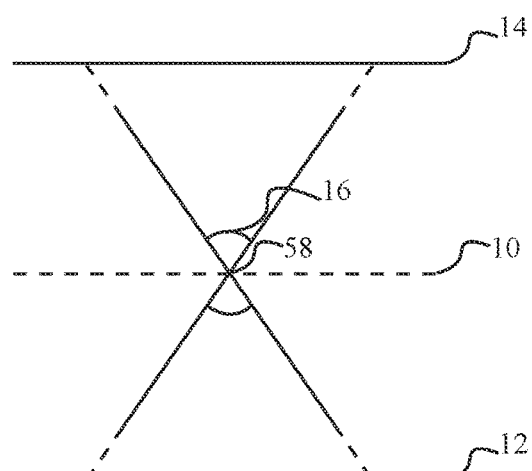
FIG. 1A: is a schematic top-down view of a single hogel in the inner frustum volume and the outer frustum volume of a light field display.

Unless defined otherwise, all technical and scientific terms used herein have the same meaning as commonly understood by one of ordinary skill in the art to which this invention pertains.

The use of the word "a" or "an" when used herein in conjunction with the term "comprising" may mean "one," but it is also consistent with the meaning of "one or more," "at least one" and "one or more than one."

As used herein, the terms "comprising," "having," "including" and "containing," and grammatical variations thereof, are inclusive or open-ended and do not exclude additional, unrecited elements and/or method steps. The term "consisting essentially of" when used herein in connection with a composition, device, article, system, use or method, denotes that additional elements and/or method steps may be present, but that these additions do not materially affect the manner in which the recited composition, device, article, system, method or use functions. The term "consisting of" when used herein in connection with a composition, device, article, system, use or method, excludes the presence of additional elements and/or method steps. A composition, device, article, system, use or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to.

The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

As used herein, the term "pixel" refers to a light source and light emission mechanism used to create a display.

As used herein, the term "light field" at a fundamental level refers to a function describing the amount of light flowing in every direction through points in space, free of occlusions. Therefore, a light field represents radiance as a function of position and direction of light in free space. A light field can be synthetically generated through various rendering processes or may be captured from a light field camera or from an array of light field cameras. In a broad sense, the term "light field" can be described as an array or subset of hogels.

As used herein, the term "light field display" is a device which reconstructs a light field from a finite number of light field radiance samples input to the device. The radiance samples represent the color components red, green and blue (RGB). For reconstruction in a light field display, a light field can also be understood as a mapping from a four-dimensional space to a single RGB color. The four dimensions include the vertical and horizontal dimensions (x, y) of the display and two dimensions describing the directional components (u, v) of the light field. A light field is defined as the function:

$$LF:(x,y,u,v) \rightarrow (r,g,b)$$

For a fixed $x_f$, $y_f$, $LF(x_f, y_f, u, v)$ represents a two dimensional (2D) image referred to as an "elemental image". The elemental image is a directional image of the light field from the fixed $x_f$, $y_f$ position. When a plurality of elemental images are connected side by side, the resulting image is referred to as an "integral image". The integral image can be understood as the entire light field required for the light field display.

As used herein, the term "voxel" refers to a single sample, or data point, on a regularly spaced, three-dimensional grid consisting of a single piece of data. A voxel is an individual volume element corresponding to a location in three-dimensional data space and has one or more data values associated with it. As used herein, the term "description of a scene" refers to a geometric description of a three-dimensional scene that can be a potential source from which a light field image or video can be rendered. This geometric description may be represented by, but is not limited to, points, quadrilaterals, and polygons.

As used herein, the term "description of a scene" refers to a geometric description of a three-dimensional scene that can be a potential source from which a light field image or video can be rendered. This geometric description may be represented by, but is not limited to, points, quadrilaterals, and polygons.

As used herein, the term "extra-pixel information" refers to information included in the description of a scene. The extra-pixel information includes, but is not limited to color, depth, surface coordinates, normals, material values, transparency values, and other possible scene information.

As used herein, the term "display surface" refers to the set of points and directions as defined by the physical spacing of individual light field hogel elements. The display surface can be planar, as in a traditional 3D display, or can be non-planar locally, globally, or at any place on the display surface as a whole. Display surfaces can be, for example, formed on non-planar curved surfaces, thus the set of points would reside on the curved display surface. Any other desired display surface geometry that may be imagined may be used for the display surface. In the abstract mathematical sense, a light field may be defined and represented on any geometrical surface and may not necessarily correspond to a physical display surface with actual physical energy emission capabilities.

As used herein, the term "elemental image" represents a two dimensional (2D) image $LF(x_f, y_f, u, v)$ for a fixed position $x_f$, $y_f$. The elemental image is a directional image of the light field from the fixed $x_f$, $y_f$ position.

As used herein, the term "integral image" refers to a plurality of elemental images connected side by side, the resulting image therefore referred to as the "integral image". The integral image can be understood as the entire light field required for the light field display.

As used herein, the term "layer" refers to any two parallel or non-parallel boundaries, with consistent or variable width, parallel or non-parallel to a display surface.

It is contemplated that any embodiment of the compositions, devices, articles, methods, and uses disclosed herein can be implemented by one skilled in the art, as is, or by making such variations or equivalents without departing from the scope and spirit of the invention.

Herein is described a system and method for volume rendering a light field wherein the light field data is subjected to a layering scheme introducing a partitioning of the hogels into subsets. Volume rendering is highly useful for medical data visualization, industrial inspection, airport security, various computational science simulations like computational fluid dynamics (CFD), wave equation simulations, and other applications. In the present system and method, each subset corresponding to a sub-volume of the layer volume, corresponds to the sub-region of the layer. Partitioning of the data combined with an efficient local memory caching technique using plenoptic downsampling strategies to reduce memory bandwidth requirements and volume rendering algorithms are capable of producing a rendered light field image. The system and method provide a reduction in the total number of samples required while still maintaining the quality of the resulting image by reducing redundancy and effective use of sampled data caching. In addition, the method provides a way to order memory accesses aligned with ray calculations in order to maximize access coherency. The presently described system and method can be combined with real-time layered scene decomposition surface rendering method in order to create a hybrid real-time rendering method that supports rendering of scenes containing superimposed volumes and surfaces.

Volume rendering allows for the visualization of an entire scalar field defined in 3D space, as opposed to the common surface rendering featured in most computer graphics. It is also possible to extend the capability to allow for visualization of higher vector fields in 3D space. Real-time volume rendering allows for interactive exploration of datasets or handling of time-varying volumetric data. A slice-based method based on slicing the volume using view aligned planes that are then texture mapped and composited in the framebuffer as they are rendered front to back has been proposed and shown to give real-time GPU-based performance. In practice, memory caching schemes help reduce the performance impact of these redundant accesses, as coherent rays are often calculated in parallel and there is redundancy from ray to ray and within a ray thread calculation itself. Even when all redundancy may be exploited perfectly, it must be accepted that in a "best worst case", every sample needs to be loaded from the voxel grid directly from DRAM at least once, thus incurring a certain latency and memory bandwidth requirement if rendering is to achieve a real-time rate (e.g. 30 Hz).

FIG. 1A illustrates an alternate scheme, that is evident from the existing art is to define an inner and outer far clip plane 14 and have rays march from the outer plane to the inner plane (or vice versa). For each hogel in a light field display, as illustrated in FIG. 1A, there is a frustum region associated with the hogel based on the hogels field of view angle θ 16 and hogel center position 58 on the display plane 10. Naively, each hogel must be rendered twice for the inner and outer hogel, then composited. The number of rays then is two for every direction represented by the display, thus many billions. An alternate scheme that is fairly evident from the existing art is to define a near clip plane 12 and far clip plane 14, wherein rays march from the far clip plane 14 to the near clip plane 12, or vice versa. This results in one ray per pixel, with many samples per ray, thus many memory accesses that could all potentially be separate DRAM accesses. In practice, using an existing GPU-based approach for light field rendering, some cache coherency can be exploited while rendering rays within a single hogel (inter-ray coherence), along with intra-ray coherence, as described previously in Hamilton et. al (2007). However, when the ray computations are structured in a conventional way, in general rays from separate hogels that access the same voxels, will not exploit caching and lead to increased DRAM accesses. What is needed to accelerate light field volume rendering is two fold; (1) a method to reduce the total number of samples required while still maintaining the quality of the resulting image and (2) a method to order memory accesses aligned with ray calculations in order to maximize access coherency so that caching can be used in order to reduce the total accesses from DRAM required.

Figure 1B:
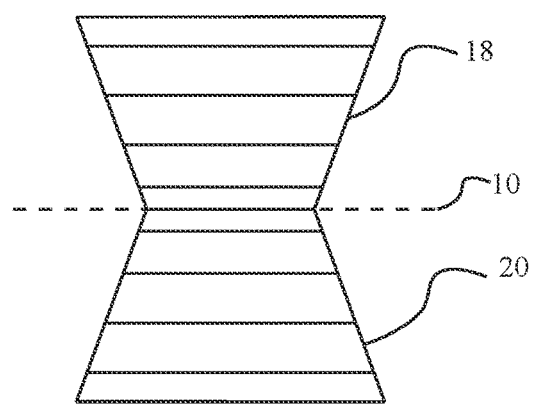
FIG. 1B: is a schematic top-down view of the inner frustum volume and the outer frustum volume of a light field display.

FIG. 1B is a schematic top-down view of the inner frustum volume 18 and the outer frustum volume 20 of a light field display. FIG. 1B illustrates schematically an exemplary layered scene decomposition of image data correlating to the inner frustum volume 18 and outer frustum volume 20 light field regions, respectively, of a display. The inner and outer frustum volume layers extend from the display plane 10. While the inner and outer frustum volumes 18, 20 are illustrated as mirror images from each other, the inner and outer frustum volume 18, 20 may have differing numbers of layers, layers of different sizes, or layers of different depths and may be rendered using different rendering techniques. Rendering techniques include but are not limited to an oblique rendering technique and a perspective rendering technique.

Figure 1C:
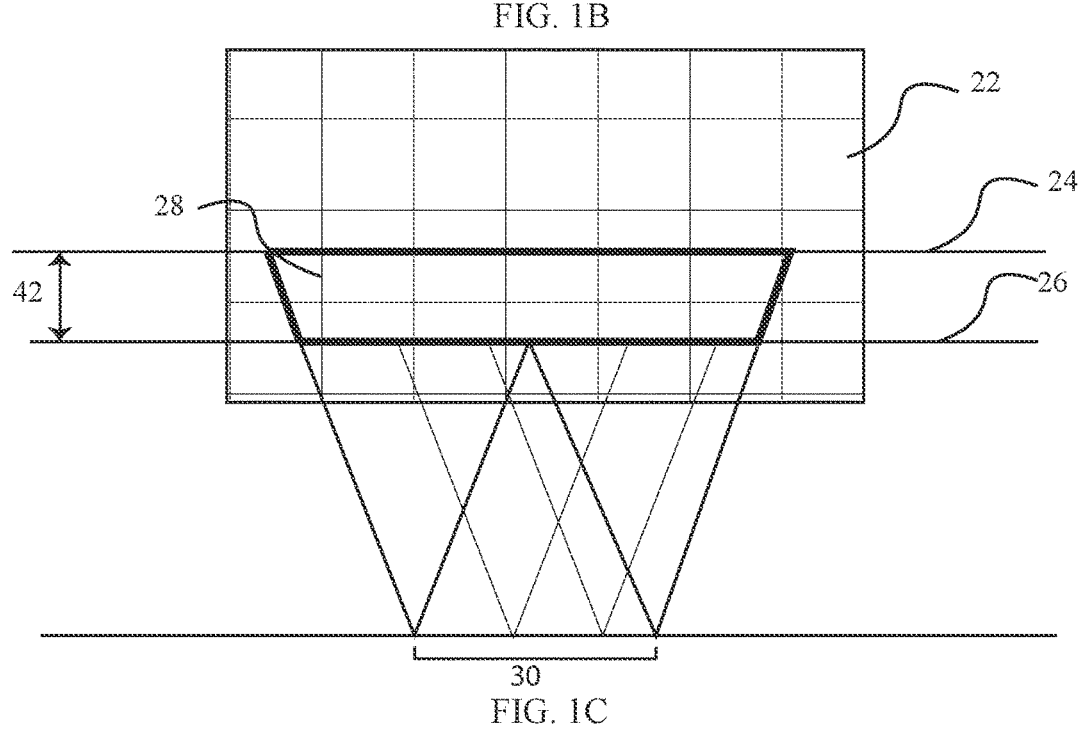
FIG. 1C: is a schematic top-down view of a single layer of the outer frustum volume of a light field display.

The voxel grid 22 is illustrated in FIG. 1C. The minimum requirements for useful light field displays are on the order of at least 1 billion pixels. Existing, obvious methods for volume rendering a light field are reviewed. Naively, each hogel must be rendered twice for the inner and outer hogel, then composited, in a method similar to the "double frustum rendering" suggested by Halle. The number of rays then is two for every direction represented by the display, thus many billions.

Figure 2:
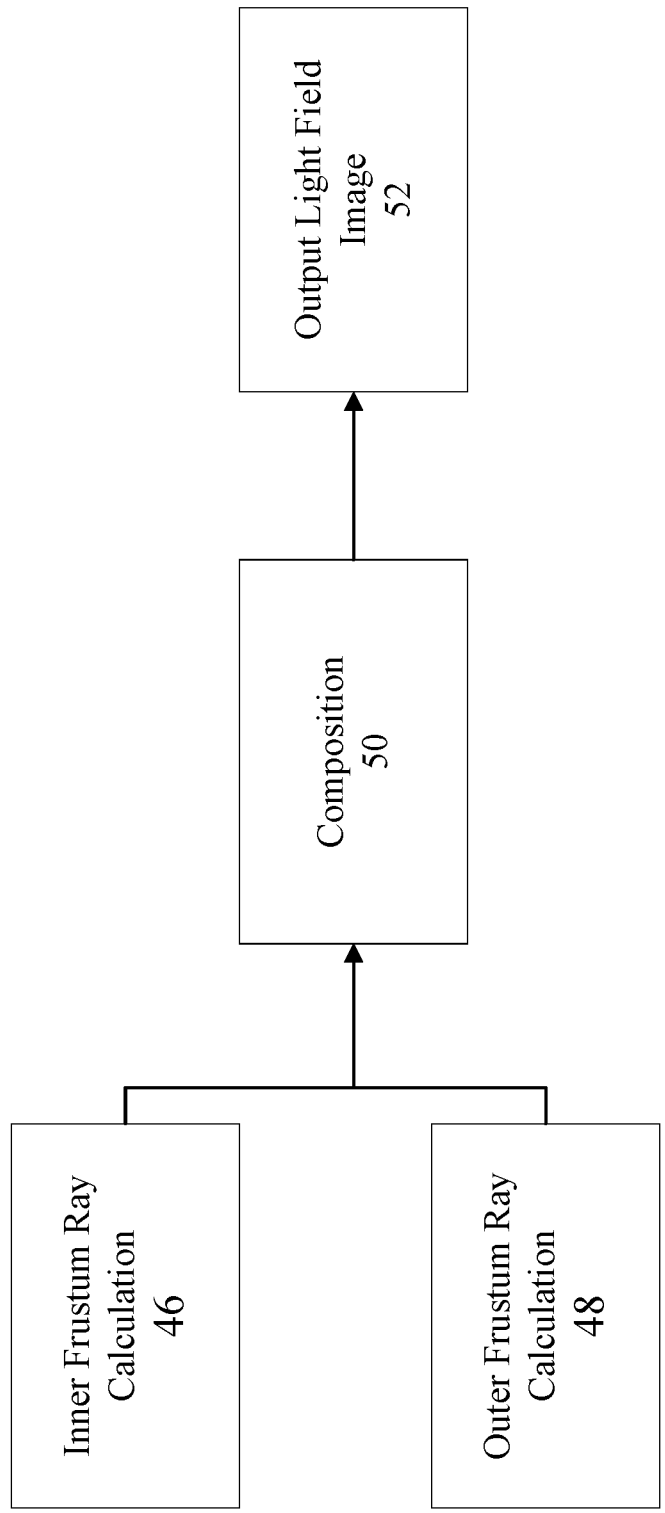
FIG. 2: is a schematic representation (block-diagram) of an embodiment of the light field volume rendering system/method.

FIG. 2 illustrates a process flow diagram of the method wherein the inner frustum ray calculation 46 and the outer frustum ray calculation 48 are performed simultaneously to render the inner and outer frustum images separately, then composite 50 them into a single output light field image 52 using the volume rendering integral discretization equations.

Figure 3A:
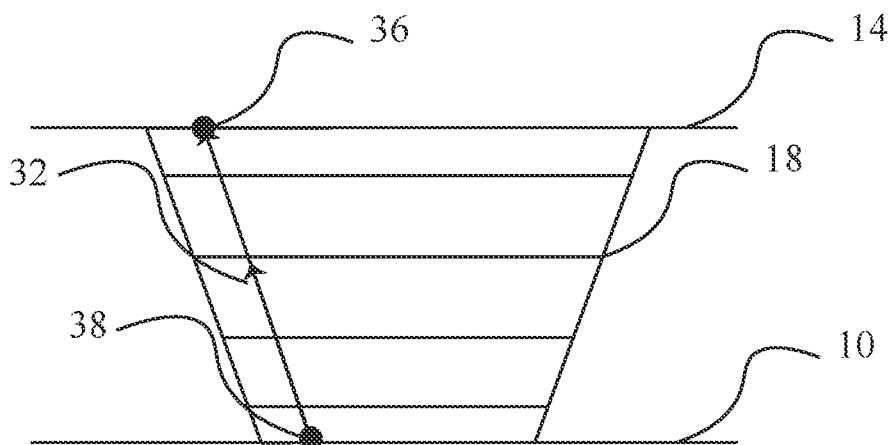
FIG. 3A: is a schematic top-down view of the inner frustum volume of a light field display illustrating a ray path of a single hogel.
Figure 3B:
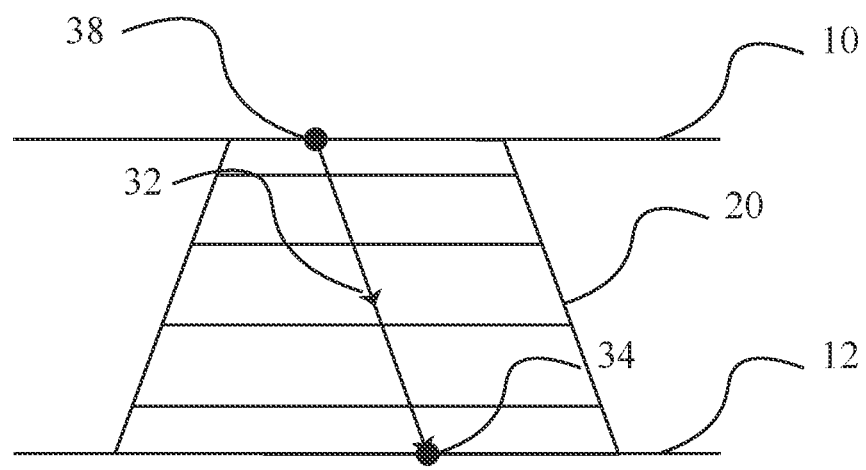
FIG. 3B: is a schematic top-down view of the outer frustum volume of a light field display illustrating a ray path of a single hogel.
Figure 3C:
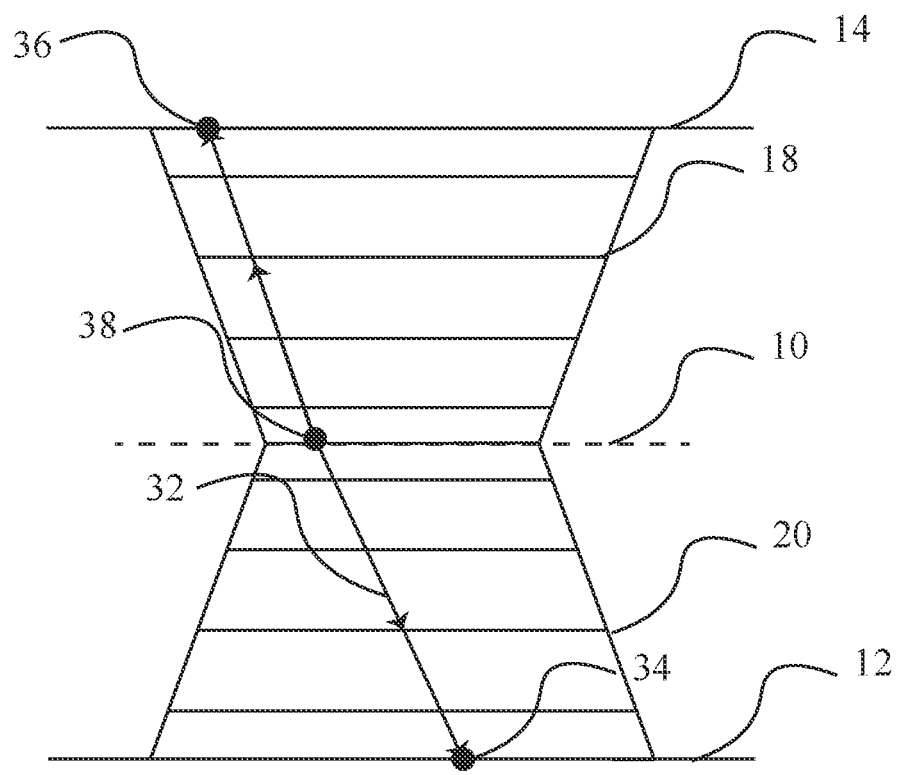
FIG. 3C: is a schematic top-down view of the inner frustum volume and the outer frustum volume of a light field display illustrating a ray path of a single hogel.
Figure 3D:
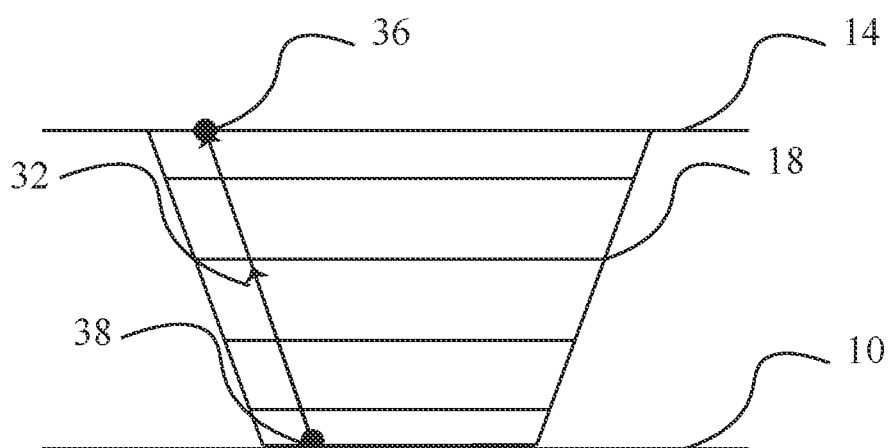
FIG. 3D: is a schematic top-down view of the outer frustum volume of a light field display illustrating an alternative embodiment of a ray path of a single hogel.
Figure 3E:
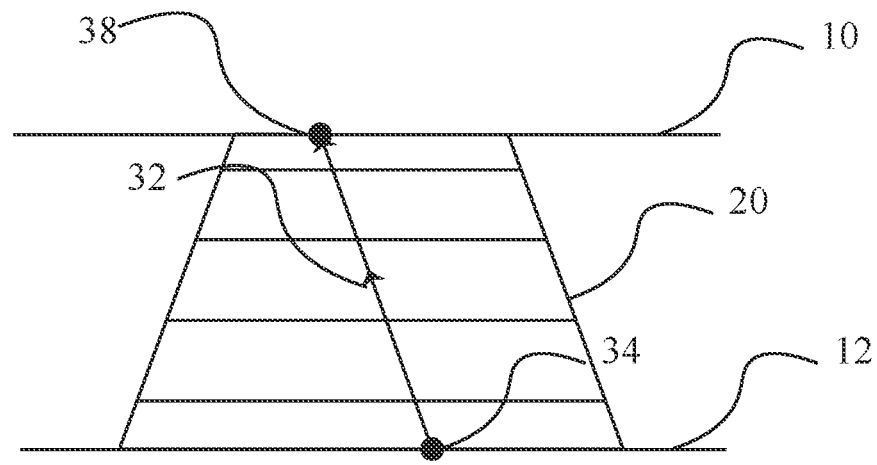
FIG. 3E: is a schematic top-down view of the inner frustum volume of a light field display illustrating an alternative embodiment of a ray path of a single hogel.
Figure 3F:
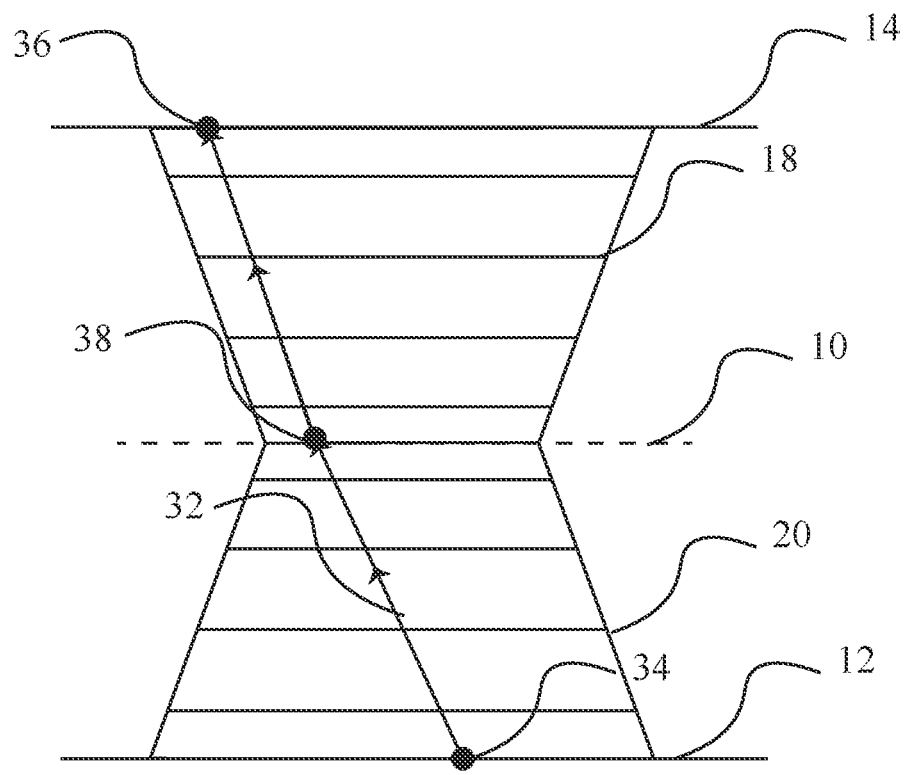
FIG. 3F: is a schematic top-down view of the inner frustum volume and the outer frustum volume of a light field display illustrating an alternative embodiment of a ray path of a single hogel.

As illustrated in FIGS. 3A-F, it is described how layers within a single frustum, for example, the inner frustum volume 18, are used for the rendering method. In volume rendering, each thread of computation associated with a single ray computes a single instance of the volume rendering integral. The integral is discretized as an accumulation calculation that takes place in front-to-back order along the ray path 32. Thus, for rendering the inner frustum volume 18 for each pixel in each hogel, it may be assumed that a ray starts at an intersection point 38 at the display plane 10 for the inner frustum volume 18, as shown and continues until reaching an intersection point 36 at the far clip plane 14 for the inner frustum volume 18. FIG. 3B illustrates the same ray path 32 in the outer frustum volume 20, travelling from the intersection point 38 on the display plane 10, traced to an intersection point 34 with the near clip plane 12. FIG. 3C combines FIG. 3A and FIG. 3B into a single figure to illustrate the ray path 32 of a single pixel from an intersection point 38 with the display plane 10 traced to an intersection point 36 at the far clip plane 14 for the inner frustum volume 18 and the ray path 32 for the same pixel in the outer frustum volume 20, travelling from the intersection point 38 on the display plane 10, traced to an intersection point 34 with the near clip plane 12. FIG. 3D thus, illustrates the inner frustum ray path 32 for an alternative embodiment of a single pixel in a hogel in which a ray path 32 is traced from an intersection point 38 at the display plane 10, as shown and continues until reaching an intersection point 36 at the far clip plane 14. FIG. 3E illustrates the outer frustum volume 20 ray path 32 for an alternative embodiment of a single pixel in a hogel in which a ray path 32 is traced from an intersection point 34 at the near clip plane 12, as shown and continues until reaching an intersection point 38 at the display plane 10. FIG. 3F combines FIG. 3D and FIG. 3E into a single figure to illustrate an alternative ray path 32 of a single pixel, travelling in a single direction, from an intersection point 34 with the near clip plan 12 traced to an intersection point 38 at the display plane 10 for the outer frustum volume 20 and then continuing into the inner frustum volume 18 until reaching an intersection point 36 on the far clip plane 14. In contrast to FIG. 3B, for rendering the outer frustum volume 20, as shown in FIG. 3E, it may be assumed that a ray starts at the near clip plane 12 and ends at the display plane 10. For any ray that starts at the near clip plane 12 in the outer frustum volume 20, it continues at a corresponding ray that starts at the display plane 10 and continues to the far clip plane 14 in the inner frustum volume 18 as shown in FIG. 3F. The outer and inner frustum ray segments may be computed separately in parallel and then amended into a single final calculation via the volume rendering integral discretization, in a straightforward way as shown through FIG. 2.

Figure 4:
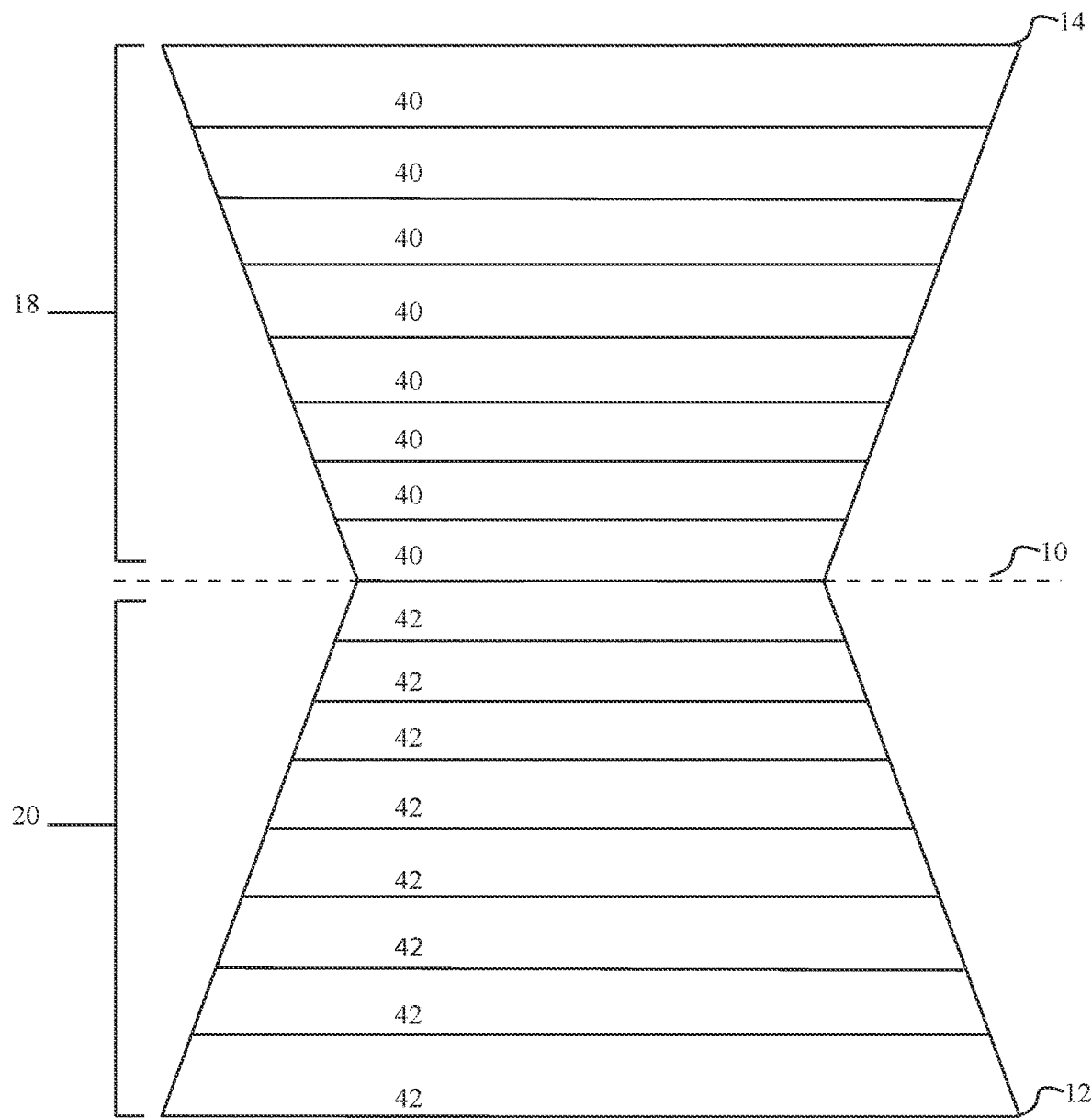
FIG. 4: illustrates schematically an exemplary layered scene decomposition of image data (two layering schemes of ten layers) correlating to the inner frustum and outer frustum light field regions, respectively, of a display.

It is shown in FIG. 4, an exemplary layered scene decomposition of image data (two layering schemes of ten layers) correlating to the inner frustum volume 18 and outer frustum volume 20 light field regions, respectively, of a display. The inner frustum volume 18 and the outer frustum volume 20 are defined by the display plane 10. The far clip plane 14 is the furthest boundary of the inner frustum volume 18 and the near clip plane 12 is the furthest boundary of the outer frustum volume 20. The inner frustum volume 18 is divided into a plurality of inner frustum layers 40, as per the disclosed layered scene decomposition technique. The outer frustum volume 20 is divided into a plurality of outer frustum layers 42 as per the layered scene decomposition technique. It should be noted, the layers 40, 42 are represented as uniform in width for illustrative purposes only. As used herein, the term "layer" refers to any two parallel or non-parallel boundaries, with consistent or variable width, parallel or non-parallel to a display surface.

Other techniques for light field volume rendering in the art have proposed using view synthesis to reduce the number of views that require rendering, which can potentially allow for a more efficient rendering system. These methods are based on supervised learning which requires significant training datasets. Also, it is not clear how the behaviors of the algorithm generalize beyond the training examples, which can result in serious artifacts.

Light field volume rendering may be defined as creating a light field image using the volume rendering model. For purposes of discussion, it is assumed one is rendering a light field image LF (x, y, u, v). A volume data function defined as v(x, y, z), typically represented as a voxel grid 22, but may be represented via point-based or tetrahedral representation (Hamilton (2013)). The volume grid may be positioned arbitrarily and rotated or maneuvered relative to the virtual light field camera. As a finite volume data is being rendered, it is assumed that in the inner frustum there is a far clip plane 14, as shown in FIG. 1A, representing the deepest boundary plane of layers. Similarly, there is a near clip plane 12 in the outer frustum representing the furthest layer boundary in that frustum from the display plane 10. Assuming the concepts of an outer frustum near clip plane 12, $C_n$ and an inner frustum far clip plane 14, $C_f$. These are critical inputs to rendering so it is known at which location to start and stop the volume rendering ray casting process. Another required input is a transfer function, which may be denoted as TF(density)|→(color, α). This could also be a more complicated function of more than just density. The defining trait is that it must serve to calculate a (color, α) for each point in the volume during the ray integral calculation. For the purposes of a real-time volume rendering, front-to-back composition equations (or back to front) may be used to calculate the volume rendering integral without significant computational burden.

The present invention relates generally to volume rendering of light field data and method and system relating to accelerated volume rendering techniques. It is observed commonly that a modern graphics processing unit (GPU) implementation of volume rendering has a DRAM memory bandwidth bottleneck as the ray casting procedure requires many samples to be taken of the volume data set. Voxels from the volume data are accessed by the rendering algorithm multiple times. If all accesses involve a read from DRAM, memory bandwidth and latency become a serious issue. In practice, memory caching schemes can help reduce the performance impact of these redundant accesses, as coherent rays are often calculated in parallel and there is redundancy from ray to ray and within a ray thread calculation itself. Even if all redundancy may be exploited perfectly, it must be accepted that in a "best worst case", every sample must be loaded from the voxel grid directly from DRAM, at least once, thus incurring a certain latency and memory bandwidth requirement.

FIG. 5 illustrates a process flow diagram of an embodiment of the disclosed method. The method consists of partitioning a three-dimensional description of a scene containing volume data into layers, each layer having an associated light field and at least one slab volume, each slab volume having an associated hogel subset such that all rays associated with the hogel subset intersect the slab volume 60. Additionally, volume rendering the light field associated with each layer using the volume data contained within the layer such that volume rendering calculations for all rays in the hogel subset are performed for rays intersecting the slab volume 62. The volume data intersecting the corresponding slab volume is cached and stored the data in a local store cache memory 64. The method also consists of blending the rendered light fields associated with each layer into a single output light field image 66.

FIG. 7 illustrates a process flow diagram of an embodiment of the disclosed method. The method consists of partitioning a three-dimensional description of a scene comprising surface data elements and volume data into a plurality of layers, each layer having an associated light field and sampling scheme 68. The method includes further partitioning at least one of the plurality of layers into a plurality of subsections, each subsection having an associated light field and sampling scheme, wherein each subsection location is determined in accordance with geometry of at least a portion of an object represented in the scene 70. For each layer and each subsection, the method includes rendering a set of pixels comprising extra-pixel information using the surface data contained within each layer and each subsection in accordance with the sampling scheme to generate a sampled light field 72. The sampled light field is reconstructed for each layer and subsection using the set of pixels 74. The light field associated with each layer is volume rendered using the volume data contained within the layer 76, and the reconstructed sampled light field and volume rendered light fields associated with each layer and subsection are blended into a single output light field image 78.

FIG. 8 illustrates a process flow diagram of an embodiment of the disclosed method that includes partitioning a three-dimensional scene containing volume data elements into layers, each layer having an associated light field and a sampling scheme, where each light field is comprised of one or more hogel subsets, where each hogel subset and the associated layer defines a sub-volume of the layer called the slab volume 80. The method further includes volume rendering the light field associated with each layer using the volume data contained within the layer in accordance with the sampling scheme 82. The rendered light fields associated with each layer are blended and upscaled into a single output light field image 84.

Various features of the invention will become apparent from the following detailed description taken together with the illustrations in the Figures. The design factors, construction and use of the light field volume rendering technique(s) disclosed herein are described with reference to various examples representing embodiments which are not intended to limit the scope of the invention as described and claimed herein. The skilled technician in the field to which the invention pertains will appreciate that there may be other variations, examples and embodiments of the invention not disclosed herein that may be practiced according to the teachings of the present disclosure without departing from the scope and spirit of the invention.

Layered Scene Decomposition (LSD) CODEC System and Methods

The layered scene decomposition encoding and decoding (CODEC) applies a strategy of drawing upon known sampling, rendering, and view synthesis methods for generating light field displays, adapting said strategies for use in conjunction with a novel layered scene decomposition strategy as disclosed herein, including its derivation, implementation and applications.

3D Displays

A conventional display as previously known in the art consists of spatial pixels substantially evenly spaced and organized in a two-dimensional array allowing for an idealized uniform sampling. By contrast, a three-dimensional display requires both spatial and angular samples. While the spatial sampling of a typical three-dimensional display remains uniform, the angular samples cannot necessarily be considered uniform in terms of the display's footprint in angular space. For a review of various light field parameterizations for angular ray distributions, please see U.S. Pat. No. 6,549,308.

The angular samples, also known as directional components of the light field, can be parameterized in various ways, such as the planar parameterizations taught by Gortler et. al in "The Lumigraph". When the light field function is discretized in terms of position, the light field can be understood as a regularly spaced array of planar-parameterized pinhole projectors, as taught by Chai in "Plenoptic Sampling". For a fixed $x_f$, $y_f$ the elemental image $LF(x_f, y_f, u, v)$ represents a two-dimensional image which may be understood as an image projected by a pinhole projector with an arbitrary ray parameterization. For a light field display, the continuous elemental image is represented by a finite number of light field radiance samples. For an idealized, planar parameterized pinhole projector, said finite number of samples are mapped into the image plane as a regularly spaced array (the regular spacing within the plane does not correspond to a regular spacing in the corresponding angular directional space).

In the case of a typical 3D light field display, the set of points and directions would be defined by the planar display plane and physical spacing of its individual light field hogel elements. However, it is known that displays can be formed on curved surfaces, thus the set of points then would reside on the curved display surface, or any other desired, display surface geometry that may be imagined. In the abstract mathematical sense, a light field can be defined and represented on any geometrical surface and may not necessarily correspond to a physical display surface with actual physical energy emission capabilities. The concept of surface light field in the literature illustrates this case, as shown by Chen et al.

The consideration of planar parameterizations is not intended to limit the scope or spirit of the present disclosure, as the directional components of the light field can be parameterized by a variety of other arbitrary parameterizations. For example, lens distortions or other optical effects in a physically embodied pinhole projector can be modeled as distortions of the planar parameterization. In addition, display components may be defined through a warping function, such as taught by Clark et al. in "A transformation method for the reconstruction of functions from nonuniformly spaced samples."

A warping function $\alpha(u, v)$ defines a distorted planar parameterization of the pinhole projector, producing arbitrary alternate angular distributions of directional rays in the light field. The angular distribution of rays propagating from a light field pinhole projector is determined by the pinhole projector's focal length f and a corresponding two-dimensional warping function $\alpha(u, v)$.

An autostereoscopic light field display projecting a light field for one or more users is defined as:

$$D=(M_x, M_y, N_u, N_v, f, \alpha, D_{LP})$$

Where $(M_x, M_y)$ are the horizontal and vertical dimensions of the display's spatial resolution and $(N_u, N_v)$ are the horizontal and vertical dimensions of the display's angular resolution components. The display is an array of idealized light field projectors, with pitch $D_{LP}$, focal length f, and a warping function $\alpha$ defining the distribution of ray directions for the light field projected by the display.

A light field LF (x,y,u,v) driving a light field display $D=(M_x, M_y, N_u, N_v, f, \alpha, D_{LP})$ requires $M_x$ light field radiance samples in the x direction, $M_y$ light field radiance samples in the y direction, and $N_u$, and $N_v$ light field radiance samples in the u and v directions. While D is defined with a single warping function $\alpha$, each of the light field planar-parameterized pinhole projectors within the array of idealized light field pinhole projectors may have a unique warping function $\alpha$, if significant microlens variations exist in a practical pinhole projector causing the angular ray distribution to vary significantly from one microlens to another microlens.

Light Field Display Rendering
Surface Rendering

Figure 6:
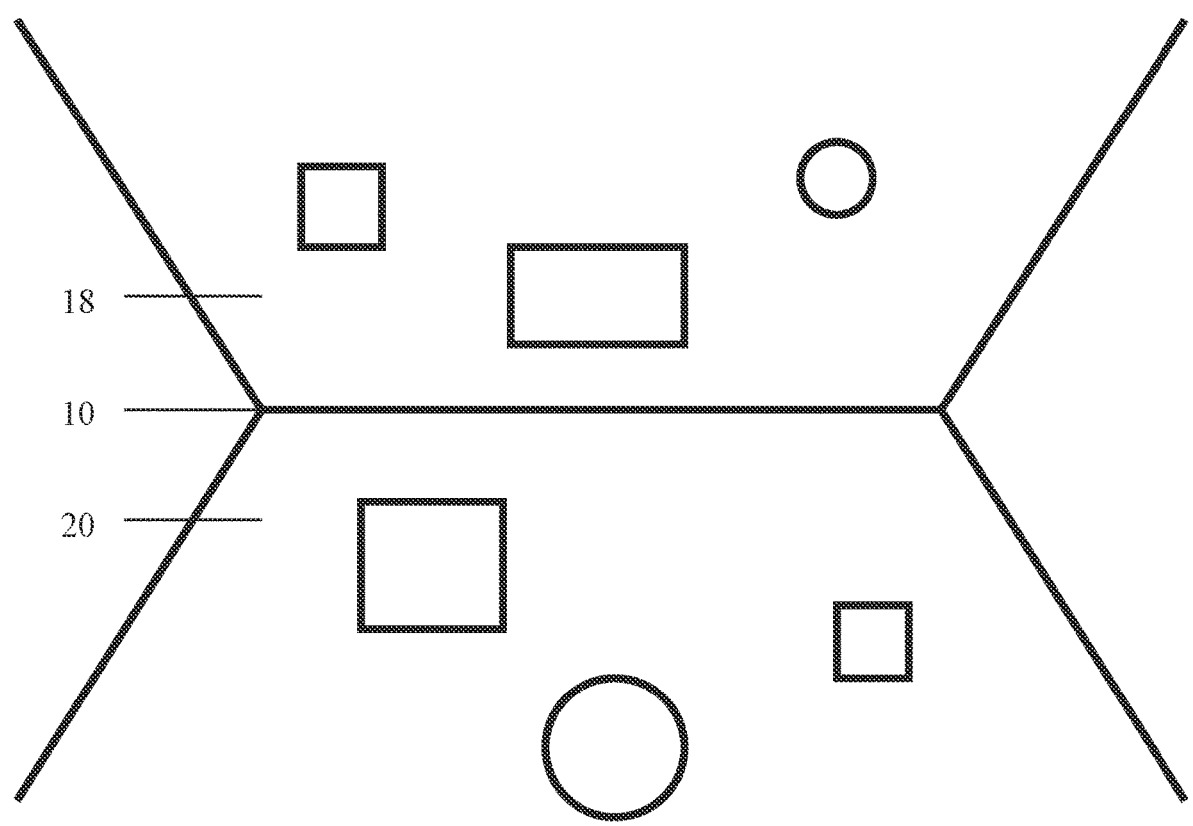
FIG. 6: is a schematic top-down view of the inner frustum volume and outer frustum volume of a light field display.

In "Fast computer graphics rendering for full parallax spatial displays," Halle et al. provide a method for rendering objects located within an inner frustum volume 18, as shown in FIG. 6 and outer frustum volume 20 of the display. FIG. 6 illustrates a light field display representing objects within a volumetric region defined by these two separate viewing frusta, with the inner frustum volume 18 located behind the display plane 10 (i.e., within the display) and the outer frustum volume 20 located in front of the display surface (i.e., outside of the display). As illustrated, various objects (shown schematically as prismatic and circular shapes) are located at varying depths from the display plane 10.

Halle et al. teach a double frustum rendering technique, where the inner frustum volume 18 and outer frustum volume 20 are separately rendered as two distinct light fields. The inner frustum volume $LF_O(x, y, u, v)$ 18 and outer frustum volume $LF_P(x, y, u, v)$ 20 are recombined into the single light field LF (x, y, u, v) through a depth merging process.

The technique uses a pinhole camera rendering model to generate the individual elemental images of the light field. Each elemental image (i.e., each rendered planar-parameterized pinhole projector image) requires the use of two cameras: one camera to capture the inner frustum volume 18 and one camera to capture the outer frustum volume 20. Halle et al. teach rendering a pinhole projector image at a sampling region of the light field using a standard orthoscopic camera and its conjugate pseudoscopic camera. For a pinhole camera C, the corresponding conjugate camera is denoted as C.

To capture an elemental image within a light field display with projectors parameterized using warping function α, a generalized pinhole camera based on a re-parameterization of an idealized planarly-parameterized pinhole camera is used. As taught by Gortler et al., a pinhole camera C with a focal length f has light rays defined by a parameterization created by two parallel planes. Pinhole camera C captures an image $I_C(u, v)$, where (u, v) are coordinates in the ray parameterization plane. The generalized pinhole camera, $C_\alpha$, is based upon a planar parameterized camera warped using a two-dimensional, continuous, invertible time-warping function, as taught by Clark et al. With a warping function α(u, v), the inverse is γ(u, v). Therefore, the image of $C_\alpha$, $I_{C\alpha} = I_C(\alpha(u, v))$.

Given the generalized pinhole camera, $C_\alpha$, a conjugate generalized camera $C^*_\alpha$ is formed to complete double frustum rendering. The views generated from a grid of $M_x \times M_y$ generalized pinhole camera pairs are rendered to render the light field for the light field display.

Therefore, the set of all generalized pinhole camera pairs that must be rendered to produce light field LF(x, y, u, v) for a given light field display D=($M_x$, $M_y$, $N_u$, $N_v$, f, α, $D_{LP}$) is defined as:

$$\{(C_\alpha, C^*_\alpha(x,y) | 1 \leq x \leq M_x, 1 \leq y \leq M_y\}$$

A set of orthoscopic cameras (O={($C_\alpha(x, y) | 1 \leq x \leq M_x$, $1 \leq y \leq M_y$}) capture the light field image corresponding to the inner frustum volume 18 and a set of conjugate generalized cameras (P={($C^*_\alpha(x, y) | 1 \leq x \leq M_x$, $1 \leq y \leq M_y$}) capture the image corresponding to the outer frustum volume 20. As described above, the inner frustum volume 18 and outer frustum volume 20 are combined into a single light field.

Layered Scene Decomposition and Sampling Scheme

The sampling gap taught by Graziosi et al. and the plenoptic sampling theory taught by Zwicker et al. provide complimentary light field sampling strategies: Graziosi et al. increase downsampling for distant objects (ΔEI) while Zwicker et al. increase downsampling for near objects ($N_{res}$). However, when downsampling a single light field representing a scene, the combination of these strategies does not guarantee compression. Therefore, the present disclosure divides a multiple-dimensional scene into a plurality of layers. This division into a plurality of (data) layers is referred to herein as a layered scene decomposition. Where $K_1$ and $K_2$ are natural numbers, it is defined L=($K_1$, $K_2$, $L^O$, $L^P$), as illustrated in FIG. 4, partitioning the inner and outer frustum volumes of a three-dimensional display.

The inner frustum volume 18 is partitioned into a set of $K_1$ inner frustum layers 40, where $L^O = \{1_1^O, 1_2^O \ldots 1_{K_1}^O\}$. Each of the inner frustum layers 40 is defined by a pair of bounding planes parallel to the display surface at distances $d_{min}(l_i^O)$ and $d_{max}(l_i^O)$ for $1 \leq i \leq K_1$ from the display plane 10. The outer frustum volume 20 is partitioned into a set of $K_2$ outer frustum layers 42, where $L^P = \{1_1^P, 1_2^P \ldots 1_{K_2}^O\}$ FIG. 1C illustrates a single outer frustum layer 42. Each outer frustum layer 42 is defined by a pair of bounding planes parallel to the display surface at distances $d_{min}(l_i^P)$ and $d_{max}(l_i^P)$ for $1 \leq i \leq K_2$ from the display surface plane. As shown in FIG. 1C, outer frustum layer 42 is bound by a pair of bounding planes 24, 26 including a first bounding plane 26 and a second bounding plane 24. In alternative embodiments, the inner frustum volume 18 and outer frustum volume 20 may be divided by layering schemes differing from each other.

Each of the layered scene decomposition layers has an associated light field (herein also referred to as a "light field layer") based on the scene restrictions to the planar bounding regions of the layer. Consider a layered scene decomposition L=($K_1$, $K_2$, $L^O$, $L^P$) for a light field display D=($M_x$, $M_y$, $N_u$, $N_v$, f, α, $D_{LP}$) with an inner frustum layer 40 $l_i^P \in L^P$ for $1 \leq i \leq K_1$, or an outer frustum layer 42 $l_j^O \in L^O$ for $1 \leq j \leq K_2$. The inner frustum light field $LF_{l_i}o$ is generated from the set of generalized pinhole cameras O={$C_\alpha$ (x, y)|$1 \leq x \leq M_x$, $1 \leq y \leq M_y$}. This equation is constrained such that only the space at distance d from the light field display surface, where $d_{min}(l_i^P) \leq d \leq d_{max}(l_i^P)$, is imaged. Therefore, for an inner frustum layer 40 with a fixed x, y and $C_\alpha(x, y) \in O$, calculate $LF_{l_i}o(x, y, u, v) = I_{C_\alpha(x,y)}$. Similarly, the outer frustum light field $LF_{l_i}P$ is generated from the set of generalized pinhole cameras P={$C^*_\alpha$(x, y)|$1 \leq x \leq M_x$, $1 \leq y \leq M_y$}. This equation is constrained such that only the space at distance d from the light field display surface, where $d_{min}(l_i^P) \leq d \leq d_{max}(l_i^P)$, is imaged. Therefore, for an outer frustum layer 42 with a fixed x, y and $C_\alpha(x, y) \in P$, calculate $LF_{l_i}P = I_{C_\alpha(x,y)}$.

The sets of light fields for the inner and outer frustum regions relative to the layered scene decomposition L can be further defined. Assume a light field display D=($M_x$, $M_y$, $N_u$, $N_v$, f, α, $D_{LP}$) with a layered scene decomposition L=($K_1$, $K_2$, $L^O$, $L^P$). The set of inner frustum region light fields is defined as $O^{LF} = \{LF_{l_i}o | 1 \leq i \leq K_1\}$. The set of outer frustum region light fields is defined as $P^{LF} = \{LF_{l_i}^P | 1 \leq i \leq K_2\}$.

As defined, a layered scene decomposition generates a light field for each layer. For any layered scene decomposition, orthoscopic cameras generate inner frustum volume 18 light fields and pseudoscopic cameras generate outer frustum volume 20 light fields. If a scene captured by these generalized pinhole camera pairs consists of only opaque surfaces, each point of the light field has an associated depth value which indicates the distance from the generalized pinhole camera plane to the corresponding point in space image. When given a light field $LF_{l_i}o \in O^{LF}$ or $LF_{l_i}o \in P^{LF}$, the $LF_{l_i}o$ depth map is formally defined as $D_m[LF_{l_i}^O](x, y, u, v)$, and the $LF_{l_i}^P$ depth map is formally defined as $D_m[LF_{l_i}^P](x, y, u, v)$. The depth maps $D_m = \infty$ where there are no surface intersection points corresponding to the associated imaging generalized pinhole camera rays. Across their domains, $d_{min}(l_i^P) \leq D_m[LF_{l_i}^P](x, y, u, v) \leq d_{max}(l_i^P)$ and $d_{min}(l_i^O) \leq D_m[LF_{l_i}^O](x, y, u, v) \leq d_{max}(l_i^O)$. In other words, depth maps associated with a layered scene decomposition layer's light field are bound by the depth bounds of the layer itself.

A merging operation can re-combine the layered scene decomposition layer sets back into the inner and outer frustum volumes 18, 20 or $LF_O$ and $LF_P$. The inner and outer frustum volume 18, 20 light fields are merged with the merging operator $*_m$. For example, when given two arbitrary light fields, $LF_1(x, y, u, v)$ and $LF_2(x, y, u, v)$, where $i = \operatorname{argmin}_{j \in \{1,2\}} D_m[LF_j](x, y, u, v)$, $*_m$ is defined as:

$$LF_1(x,y,u,v) *_m LF_2(x,y,u,v) = LF_i(x,y,u,v)$$

Therefore, $LF_O(x, y, u, v)$ and $LF_P(x, y, u, v)$ can be recovered from the sets $O^{LF}$ and $P^{LF}$ by merging the light fields associated with the inner and outer frustum layers 40, 42. For example:

$$LF_O = LF_{l_1}{}^O *_m LF_{l_2}{}^O *_m \cdots *_m LF_{l_{K1}}{}^O$$

$$LF_P = LF_{l_1}{}^P *_m LF_{l_2}{}^P *_m \cdots *_m LF_{l_{K1}}{}^P$$

This provides a layered scene decomposition operation and an inverse operation which merges the data to reverse said decomposition. Performing a layered scene decomposition with K layers is understood to create K times as many individual light fields. The value of the layered scene decomposition is in the light fields induced by the layers; these light field layers are more suitable for downsampling than the original total light field or the inner frustum volume 18 or outer frustum volume 20 light fields, as the total data size required for multiple downsampled layered scene decomposition light field layers with an appropriate sampling scheme is significantly less than the size of the original light field.

The skilled technician in the field to which the invention pertains will appreciate that there are multiple types of sampling schemes that can successfully sample a light field. The sampling scheme S provided is not intended to limit or depart from the scope and spirit of the invention, as other sampling schemes, such as specifying individual sampling rates for each elemental image in the layered scene decomposition layer light fields, can be employed. Relatively simple sampling schemes can provide an effective CODEC with greater sampling control; therefore, the present disclosure provides a simple sampling scheme to illustrate the disclosure without limiting or departing from the scope and spirit of the invention.

A light field sampling scheme provided according to the present disclosure represents a light field encoding method. Given a display $D = (M_x, M_y, N_u, N_v, f, \alpha, D_{LP})$ and a layered scene decomposition $L = (K_1, K_2, L^O, L^P)$, the present disclosure provides a sampling scheme S associated with L as an $M_x \times M_y$ binary matrix $M_S [l_i]$ associated with any layer $l_i$ in $L^O$ or $L^P$ and a mapping function $R(l_i)$ to map each layer $l_i$ to a pair $R(l_i) = (n_x, n_y)$. A binary ({0,1}) entry in $M_S [l_i]$ at $(x_m, y_m)$ indicates if the elemental image $LF_{l_i}(x_m, y_m, u, v)$ is included in the sampling scheme: a (1) indicates $LF_{l_i}(x_m, y_m, u, v)$ is included, and a (0) indicates $LF_{l_i}(x_m, y_m, u, v)$ is not included. $R(l_i) = (n_x, n_y)$ indicates the elemental images in light field $LF_{l_i}$ are sampled at a resolution of $n_x \times n_y$.

The present disclosure also provides a layered scene decomposition light field encoding process that draws upon plenoptic sampling theory. The following description pertains to the inner frustum volume $L^O$ 18 of a layered scene decomposition L, but the outer frustum volume $L^P$ 20 may be encoded in a similar fashion.

For each $l_i \in L^O$, the depth map of the corresponding light field $LF_{l_i}$ is restricted to d in the range $d_{min}(l_i^O) \leq d \leq d_{max}(l_i^O)$. Based on the sampling scheme presented above, the present disclosure creates a sampling scheme S using the following equation to guide the creation of $M_S[l_i^O]$:

$$\Delta EI(d_{min}(l_i^O)) = \frac{(2 d_{min}(l_i^O)) \tan(\theta/2)}{D_{LP}}$$

In other words, $\Delta EI$ guides the distance between "1" entries in the $M_S$ matrix associated with each layered scene decomposition layer. The following equation sets the resolution of the individual elemental images $$R(l_i^O) = \frac{d_{max}(l_i^O)}{f}, \frac{d_{max}(l_i^O)}{f}$$

in a layer:

$$N_{res}(d_{max}(l_i^O)) = \frac{d_{max}(l_i^O)}{f}$$

This sampling scheme, using both $\Delta EI$ and $N_{res}$ to drive individual layered scene decomposition layer sampling rates, can be considered as a layered plenoptic sampling theory sampling scheme (otherwise referred to herein as "plenoptic sampling scheme"). This plenoptic sampling scheme is based on a display utilizing the plenoptic sampling theory identity function $\alpha(t) = t$. This per-layer sampling scheme provides lossless compression for fronto-parallel planar scene objects where the objects within a layer do not occlude each other.

The assumption of only fronto-parallel planar scene objects is restrictive and does not represent typical scenes; inevitably there are intra-layer occlusions, especially for layered scene decomposition layers that are larger in size. To capture and encode a full range of potential scenes without introducing significant perceivable artifacts, the system can draw upon information in addition to the light field plenoptic sampling scheme of the present disclosure.

Volume Rendering

Levoy (1988) first presented that direct volume rendering methods generate images of a 3D volumetric data set without explicitly extracting geometric surfaces from the data. Kniss et al. present that though a data set is interpreted as a continuous function in space, for practical purposes it is represented by a uniform 3D array of samples. In graphics memory, volume data is stored as a stack of 2D texture slices or as a single 3D texture object. The term voxel denotes an individual "volume element," similar to the terms pixel for "picture element" and texel for "texture element." Each voxel corresponds to a location in data space and has one or more data values associated with it. Values at intermediate locations are obtained by interpolating data at neighboring volume elements. This process is known as reconstruction and plays an important role in volume rendering and processing applications.

The role of an optical model is to describe how light interacts with particles within the volume. More complex models account for light scattering effects by considering illumination (local) and volumetric shadows. Optical parameters are specified by the data values directly, or they are computed from applying one or more transfer functions to the data to classify features in the data.

At the core of a volume rendering calculation process is calculation of the volume rendering integral along viewing rays. While in the art this is expressed theoretically as a continuum based integral calculation, in practice it is often calculated as a discrete sum based approximation, based on an operation referred to as compositing (Ikits et al. 2004). Compositing operations can be performed along a ray in a front-to-back or back-to-front ordering. It is also possible that partial ray segments can be composited in some order within themselves, then composited with adjacent partial ray segments while still preserving mathematical equivalency of the scheme.

For the purposes of this disclosure, we refer to any calculations performed during or around the volume rendering integral calculation around the ray as "volume rendering calculations". This can include, but should not be limited to, lighting calculations, gradient reconstruction in support of lighting calculations, compositing operator calculations, transfer function calculation, or any combinations of these potentially required calculations.

In general, for the purpose of this document, any kind of operation which merges two colors to produce a third is referred to as "blending". Compositing as described above can be seen as a form of blending that occurs at each sample step along a volume rendering integral calculation.

Interactive direct volume rendering is required for interactive viewing of time-varying four-dimensional (4D) volume data, as progressive rendering may not work well for that particular use case as presented by Martin. Example use cases for interactive direct volume rendering include but are not limited to the rendering of static voxel-based data without artifacts during rotation, rendering of time-varying voxel-based (e.g., 4D MRI or Ultrasound, CFD, wave, meteorological, visual effects (OpenVDB) and other physical simulations, etc.) data.

Volume rendering is inherently a parallel process, as there are many rays being cast whose computations can in theory be performed independently without reference to each other. However, as discussed, even amongst independent parallel threads, there is often overlap in memory accesses. In order to get the highest effective memory throughput possible and thus a more efficient execution of the total computational process from a time perspective, it makes sense to coordinate memory accesses so that independent threads whose memory accesses overlap can be organized to best exploit this overlap. Overlap such as this is exploited using fast cache memories, typically.

Previous works, Hamilton (2007, 2013) and U.S. Pat. No. 8,564,617, reveal how volume rendering calculations for 2D images may be coordinated to allow separate threads to exploit this overlap. Modern microprocessors utilize faster, but smaller, cache memories that help to automatically exploit access redundancy from relatively slower, but larger, DRAM memory. However, the mechanism these caches use for deciding which data to cache is often based on various locality principles. These are often good predictors of redundancy and result in performance enhancement.

However, in many calculations, the redundancy patterns are not automatically optimally modeled by these locality heuristics. Several processor technologies allow for the implementation of a user-programmable cache memory as well as purpose built computing processors that take the form of custom application-specific integrated circuits (ASICs) or field-programmable gate arrays (FPGAs). Modern FPGAs contain large on-chip SRAMs which can be exploited in custom-programmed circuits on chip. NVIDIA's GPU and its compute unified device architecture (CUDA) application programming interface (API) allow for a user-programmable cache memory that is shared by a group of parallel threads during their execution. Previously, the Cell processor had a similar user-programmable cache (Hamilton et al 2007) shared by a number of parallel processing elements.

Naive Light Field Volume Rendering Algorithm

In the 2D case and given modern GPU hardware, a very common choice for a real-time, interactive volume rendering implementation is to simply use a ray-casting based approach. Each ray may be computed in parallel independently using the massive parallelism of modern GPUs. For each ray, this involves a simple intersection calculation with the volume data's bounding volume and then marching a ray at a predefined sampling rate. One naive method for interactively volume rendering an image for a light field display is to use this same 2D method for each individual hogel in the display. One method is to render the inner (orthoscopic) and outer (pseudoscopic) frustum images separately, then composite them into a single image using the volume rendering integral discretization equations. One downfall of this approach is the potential need to buffer the inner and outer frustum calculations separately, as this may require large memory storage and consequently memory bandwidth as light field images will require an enormous number of rays compared to conventional 2D images.

For each hogel in a light field display, as illustrated in FIG. 1A, there is a frustum region associated with the hogel based on the hogels field of view angle θ 16 and hogel center position 58 on the display plane 10. Naively, each hogel must be rendered twice for the inner and outer hogel, then composited. The number of rays then is two for every direction represented by the display, thus many billions. An alternate scheme that is fairly evident from the existing art is to define a near clip plane 12 and far clip plane 14, wherein rays march from the far clip plane 14 to the near clip plane 12, or vice versa. This results in one ray per pixel, with many samples per pixel, thus many memory accesses that could all potentially be separate DRAM accesses. In practice, some cache coherency can be exploited, but in general there is plenty that is not. What is needed to accelerate light field volume rendering is two-fold; the first is a reduction in the total number of samples required while still maintaining the quality of the resulting image and the second is a method to order memory accesses aligned with ray calculations in order to maximize access coherency. This allows caching to be used in order to reduce the total accesses from DRAM required.

The procedure may be simplified by calculating a ray on its path from the inner to outer frustum (or vice versa) all in one single, continuous parallel thread of execution. As described herein, a near clip plane 12 is defined in the outer frustum and a far clip plane 14 in the inner frustum and trace a ray from one clip to the other, through the display plane 10 at the location of its corresponding hogel.

The issue with the aforementioned methods is that for typical and future light field displays, there are many ray casting calculations that must be performed. For each ray, many samples of the volume data are required. Naively implemented, these parallel rays' voxel access patterns will often overlap, but still result in redundant DRAM memory accesses for the voxels. In total, this results in a method that has performance challenges and scaling to larger displays presents a challenge.

Accelerated Light Field Volume Rendering

Considering a display $D=(M_x, M_y, N_u, N_v, \alpha, D_{lp})$ and a layered scene decomposition $L=(K_1, K_2, L^O, L^P)$ and a light field LF (x, y, u, v) that is driving display D. Let f denote the focal length of the pinhole projectors associated with display D's hogels.

Consider a layer $l_p$ that is in either $L^O$ or $L^P$ (inner or outer frustum, respectively). Consider that $l_p$ has some $d_{min}(l_p)$ and $d_{min}(l_p)$ representing the bounding planes of the layer. Based on the definition of D, the display and its corresponding light fields consist of a 2D array of $M_x$ by $M_y$ hogels. One may index these hogels as $H_{i,j}$ for $1 < i < M_x$ and $1 < j < M_y$. The sector partitioning P of layer $l_p$ can be defined relative to the function ΔEI, as a partitioning of the set of hogels into subsets of size at most $\Delta EI(d_{min}(l_p))^2$, whereby the subsets are formed based on (i,j) in subintervals of size at most $\Delta EId_{min}(l_p)$.

It is possible that a partition can be created such that subsets are all of uniform size $\Delta EI(d_{min}(l_p))^2$, namely if $\Delta EId_{min}(l_p)$ divides evenly into both $M_x$ and $M_y$. In practical circumstances, this may likely not occur. In this case, subsets may be non-uniformly sized or can be created such that the lengths of the sub-intervals they are based upon are less than $\Delta EId_{min}(l_p)$ in size.

FIG. 1C illustrates that intuitively, a sector partitioning of an outer frustum layer $l_p$ 42, wherein layer $l_p$ may also be an inner frustum layer, an outer frustum layer 42, or combination thereof. Relative to LEI 30, hogel subsets are created and are of a size that maximally captures or takes advantage of ray sample overlap at the depth of the given layer amongst the hogels in the subset. It is possible that in practice, the subset sizes may need to be adjusted in order to align with practical limits on cache sizes, etc. or other aspects of the underlying architecture.

Considering a display, D and a layered scene decomposition, L and a light field LF. Consider any layer $l_p$ 42 from L in a voxel grid 22. Consider P, a sector partitioning of $l_p$ relative to ΔEI 30. Consider a subset of hogels $H_S$ of P. The set of hogels in $H_S$ defines a sub-frustum of the main display double frustum, defined by the field of view extents of the summation of all the hogels. As illustrated in FIG. 1C, the slab 28 of layer $l_p$ 42 is defined relative to subset $H_S$ as the region of volume defined by the intersection of the layer $l_p$ 42 with the sub-frustum induced by the hogels in $H_S$. An important observation is that any of the rays associated with the hogels within a given hogel subset intersect with the slab 28 relative to layer $l_p$ 42. All samples along these rays that occur within the layer occur within this slab 28. Therefore, the slab 28 can function as a unit of volume to target for user-programmable caching behavior as opposed to a fixed functionality cache.

In order to determine precisely which voxels to cache when calculating the ray samples associated, the notion of how a slab 28 intersects with voxel data must be defined. As an example of a practical case, consider a voxel data set $V_{(x,y,z)}$, defined on some discrete domain, given slab $S_l$ 28 of a layer $l_p$ 42 and a given reconstruction neighborhood size (for discussion, assume uniform K×K×K, but can be non-uniform) required for sample reconstruction from voxel data. Then define the intersection of slab $S_l$ 28 with layer $l_p$ 42 as the set of voxels of V contained within the slab 28 region, plus those located within a K×K×K neighborhood of those contained strictly within the slab 28.

As shown in FIG. 1C, for a sector subset $P_S$ from a sector partitioning P of a layered light field at depth i*f for a layer $l_p$ with depths $d_{min}$ and $d_{max}$. One can define a frustum region that is made up of the intersection of the volume enclosed by the layer L and the sum of the volumes of the frustums associated with all of the hogels of a given sector partition. This frustum region may be referred to as the slab 28 of $P_S$ relative to layer L.

As described herein, is a method of caching in conjunction with parallel light field volume rendering calculations. In theory, for a ray-casting volume rendering method which renders a light field image, each ray requires calculation of the volume rendering integral along its path at some chosen sampling rate, which may be uniform or variable along the path of the ray. The final output of this ray calculation is a color value for the pixel element of the rendered light field image associated with the ray. It is the plurality of these ray calculations then make up the entire desired light field image. In theory, each of the ray-pixel calculations can be performed completely independently of the others and will result in the same rendered output.

However, it is often advantageous that these theoretically independent, parallel calculation threads are executed in a more coordinated fashion that allows for threads which access the same slow memory locations to use a faster cache memory for repeated accesses in order to alleviate the memory throughput and latency penalties associated with repeated accesses to slow memory.

The key to the proposed accelerated method is a scheme to structure and coordinate independent ray calculation threads so that threads whose memory access requirements overlap can be performed simultaneously and able to take advantage of a common fast cache memory to accelerate the overall ray calculation process.

A key observation is that given a layered scene decomposition, all rays will pass through each of the layers at some point. Each layer defined hogel subsets, which further subdivide layers into slab volumes. Thus, we can further observe that as any ray passes through a layer, it also intersects at least a single slab volume. We can further observe that all rays that correspond to a hogel subset will intersect the slab volume associated with the hogel subset.

The key to the methods disclosed herein lies in coordinating ray calculations such that all the rays associated with a hogel subset intersect the same slab volume and any partial ray calculations performed for each ray's segment within the slab volume are performed in a synchronous fashion.

In computer science, process synchronization refers to the idea that multiple processes are to join up or handshake at a certain point in order to reach an agreement or commit to a certain sequence of action.

The key to this method is that all rays that correspond to a hogel subset will synchronize and intersect the corresponding slab 28 as they are required to share a common, programmable local store cache memory in order for this technique to realize an improved efficiency. It is similar to the method described previously, with the exception that hogel subsets must be scheduled and synchronized around a local store cache. Within the hogel subset group, all the voxels that intersect the slab 28 should be pre-loaded in local store memory prior to the step that synchronizes the ray calculations for all rays in the hogel at their initial entrance into the slab 28. Once all rays are in the slab 28, they will perform reconstruction calculations associated with re-sampling points located along the ray path by only accessing voxels (or other) volume elements from the local store cache memory. A ray marches, or "stops" at discrete points along the ray path, these discrete points are herein referred to as re-sampling points.

One embodiment of this process involves denoting a single computation thread associated with the rays intersecting a single slab volume as the "master" and the others as a "slave", in that the master initiates slow memory accesses in order to initialize a fast cache memory for itself and the slave threads in subsequent computation. The slaves must synchronize with the master in the sense that they must wait until the required numerical values from slow memory have been pre-loaded into cache memory before they can be accessed, and subsequent ray calculations can be performed. We denote the master ray as the "primary ray" and the slave threads as the "secondary ray" in the code example. One possible embodiment of this approach is described using the following pseudocode:

```
for every layer L in (insert right symbols for layer list), in the order from near clip
to far clip
    calculate the hogel partition relative to the layer L, call it P.
    Produce a list of subsets of hogels.
    for each subset of hogels
        for every ray-pixel R in this subset of hogels
            determine if R is a primary ray for its hogel subset
            determine the slab of L relative to this hogel subset
        if (R is primary ray)
            load all voxels that intersect the slab of L into local store
            ("volume data cache")
        for every sample along ray R while in layer L
            density = sample volume data cache to reconstruct density
            at sample location
            accumulate alpha and color using previous values (from
            previous layer if necessary) and transfer function evaluated
            with density and store in alpha_accum and color_accum,
            respectively.
        Write color_accum to the light field pixel for R
```

There are many parameters that may be altered to influence performance and/or suitability for implementation on a particular architecture. The layer scheme chosen will significantly determine the slab 28 size. A larger slab 28 size will intersect with a larger number of voxels, thus requiring a large pre-load stage before the user-programmable voxel cache will be loaded. For example, for a display with a large FoV and in wide layers that are far from the display will result in relatively very large slab 28 sizes that will likely intersect with many voxel data points.

There are two apparent ways to combat this issue. One may choose sector partitions with smaller hogel subsets, less than $d_{min}(l_p)^2$, as that will decrease the width of the resulting slabs 28 formed with the layers. This may decrease the overall theoretical ability for the method to exploit overlap and thus increase the total DRAM bandwidth required but may be an acceptable trade depending on the circumstances. Another possibility is to choose narrower layers, as that inevitably decreases the other width dimension of the resulting slabs 28.

Consider a slab 28 relative to some layer and some sector partitioning. It may be seen that as the directional resolution of the display is scaled, keeping the same layering scheme results in the slab 28 geometry remaining unchanged. It is easy to see that for any of the hogels in this hogel subset, when the corresponding rays intersect this slab 28, they require only the set of voxels from the intersection of the slab 28 with the $V_{(x,y,z)}$ dataset.

Thus, the number of voxels loaded into cache relative to an individual slab 28 remains the same, regardless of directional resolution. As directional resolution increases, and all else remains fixed, the proportion of voxel accesses that come from cache increases while the memory bandwidth required from DRAM remains fixed. This is a nice scaling property, in that higher quality displays benefit using this optimized approach even more over the conventional brute force approach.

Plenoptic Down-Sampling Strategies to Reduce Memory Bandwidth Requirements

Another means to improve performance for light field volume rendering and reduce direct access required to DRAM would be to reduce the total number of reconstruction samples required along ray paths, thus limiting the total number of voxel accesses. It is observed that in the disclosed surface scene based layered scene decomposition CODEC work, layers may be downsampled based on their distance from the display plane 10. This is a principle of plenoptic sampling theory as described in Zwicker et al. It is observed in practice that in many cases this down-sampling results in very small or unsubstantial (ultimately imperceptible) changes to the resulting light field image when viewed on a light field display.

To be specific, for a given display configuration with hogels having focal length f, in order to represent a layer with max depth d, it is required, a directional resolution of:

$$N_{res}d = \frac{d}{f}$$

Any ray associated with the hogels within a given sector partitioning P, intersect with the slab of P 28 relative to layer L. All samples along these rays that occur within the layer L, occur within this slab 28.

It is observed that while in a worse-case scenario, there must be a single ray computed for every pixel, for a given slab 28, the set of sampling rays associated with a sector subset can actually decrease and increase in numbers based on the layers maximum depth. When less rays are used, a single ray represents many pixels instead of in one-to-one correspondence. The idea is that this down-sampling should be performed such that it either does not at all or does not substantially affect the quality of the resulting light field image.

Previously, in the context of the layered scene decomposition definition, individual layers were associated with a sampling scheme which represents which pixels to include (or not) within the light field image associated with each layer. We may use a similar convention in the context of volume rendering method based also on layered scene decomposition in order to specify precisely a down-sampling scheme. We propose to further use the convention that in the context of rendering a light field associated with a given layer using a ray-casting procedure (as is proposed for volume rendering herein), rays which correspond to pixels that are included in the sampling are referred to as "active" whereas those which are excluded through the sampling scheme can be referred to as "dormant".

It is an object of the present disclosure that the same ray sampling principle may be applied to sample the imaging volume along a ray-casting accumulation process. In other words, a single ray is initially cast, which in turn, branches into multiple rays thereby also recursively branching into further rays during the volumetric accumulation process. This branching process can be dictated by a sampling principle. For example, one possible embodiment is that for each focal length of depth, the directional resolution required to capture detail at that depth must increase by 1. Thus, rays branch according to this principle along each focal length increment, in theory.

The benefit of this approach is that as the ray accumulation process is near the display, less samples of the volume are required to compute the volume rendering integral. As the rays approach the maximum depth of field of the display, the sampling rate approaches that of the naive approach, whereby every hogel pixel is associated with an individual ray for the entire ray process. The reduction in the required number of samples may be quantified and analyzed mathematically.

The fraction of samples required for the proposed scheme are calculated versus the naive scheme all hogel pixels accumulating samples, at a constant rate at all depths from the display plane 10. Without loss of generality, a single hogel is considered for analysis, as everything applies up to a multiplicative factor, based on the number of hogels.

Let $D_r$ indicate the directional resolution of the light field (assuming a $D_r*D_r$ hogel).

Based on the plenoptic sampling idea, i.e., assuming an ideal, planar parameterized ray distribution, it is hypothesized that to sufficiently sample objects at distance $i*f$ where i is an integer and f is the focal length of the hogel lens, the directional resolution must be i. Thus, one requires $i^2$ rays at depth $i*f$.

Considering a case wherein a ray travels only within a single frustum, it is assumed that for volume rendering, there is a ray-casting procedure wherein rays march from the display surface to the maximum depth of field of the display. at depth $D_r*f$. Within each f wide layer, at least $i^2$ rays are required when the layer is at depth $i*f$.

It is assumed that rays sample the volume at a rate of M per distance off traveled from the display surface. Thus, an expression results to describe the number of samples per associated with such a hogel over the total course:

$$N_{sam} = \sum_{j=1}^{D_r} Mj^2 = M\frac{D_r(D_r+1)(2D_r+1)}{6}$$

Under naive sampling, whereby all $D_r*D_r$ pixels per hogel have an associated ray over the entire course of the ray's journey and assuming the same sampling rate of M, the number of samples would be $D_r^2*M$ per f wide layer. Thus, over $D_r$ layers, the total number of samples is $D_r^3*M$.

Thus, one may calculate the ratio of samples under the proposed sampling scheme, versus the naive sampling scheme:

$$\text{Ratio}_{samples} = \frac{M\frac{D_r(D_r+1)(2D_r+1)}{6}}{MD_r^3} = \frac{(D_r+1)(2D_r+1)}{6D_r^2}$$

It is noted that:

$$\frac{(D_r+1)(2D_r+1)}{6D_r^2} = 1/3$$

For lower values of $D_r$ such as $D_r=32$, it is shown that $\text{Ratio}_{samples}$ evaluates to 0.36, which is very close to the limit value of 1/3. Thus, it may be said that for useful values of $D_r$, the sample number is reduced to approximately 1/3. It is hypothesized that in practice, this will result in a higher performing algorithm, as the standard naive approach is bandwidth limited.

We describe a possible way this strategy may be implemented using pseudocode below. We present the implementation such that within a given layer and a given hogel, rays are marked as either "active" or "dormant" based on whether they are included in the sampling scheme or not.

When rays are dormant within a particular layer, the advantage of this method is that we can essentially avoid performing volume rendering calculations for those rays within that particular layer. This means that sampling of the volume data can be avoided as well as other volume rendering calculations such as gradient reconstruction calculations from the volume data, lighting calculations or transfer function calculations.

When a ray is dormant, however, it must still be assigned a color and a value in order to enable blending calculations to be performed with respect to the same rays calculations related to adjacent layers where the same ray may or may not be similarly dormant. We refer to the process of assigning a dormant ray a color as "upscaling" for the purposes of this spec. We propose that one preferred way to implement this operation would involve interpolation using neighboring rays, which could involve a nearest neighbor interpolation method, linear interpolation or potentially an edge-adaptive interpolation technique.

A possible implementation of this approach is described using pseudocode:

```
for every layer L in (insert right symbols for layer list), in the order from near clip
to far clip
    for every ray-pixel R
        determine if ray is active or dormant
        for every sample along ray R while in layer L
            if (ray active)
                density = sample volume data cache to reconstruct density at
sample location
accumulate alpha and color using previous values (from previous layer if
necessary) and transfer function evaluated with density and store in alpha_accum
and color_accum, respectively
            else if (ray is dormant)
                color_accum = interpolate from nearest active rays within hogel
                alpha accum = interpolate from nearest active rays within hogel
        Write color_accum to the light field pixel for R
```

It is also possible to combine downsampling specified on a per-layer basis with the previously described method of caching volume slab elements and synchronizing corresponding volume rendering ray calculations. Using an approach exploiting both reduced samples and layer-based caching, a process has been derived to produce a rendered light field image as an output. The pseudocode is as follows:

```
for every layer L in (insert right symbols for layer list), in the order from near clip to far
clip
    calculate the hogel partition relative to the layer L, call it P.
    Produce a list of subsets of hogels.
    for each subset of hogels
        for every ray-pixel R in this subset of hogels
            determine if R is a primary ray for its hogel subset
            determine the slab of L relative to this hogel subset
            if (R is primary ray)
                load all voxels that intersect the slab of L into local store ("volume data
                cache")
                determine if ray is active or dormant; (refer to spec and create a
                separate pseudocode break out to describe this sub-process)
                for every sample along ray R while in layer L
                    if (ray active)
                        density = sample volume data cache to reconstruct density at
                        sample location
accumulate alpha and color using previous values (from previous layer if necessary) and
transfer function evaluated with density and store in alpha_accum and color_accum,
respectively
                    else if (ray is dormant)
                        color_accum = interpolate from nearest active rays within hogel
                        alpha accum = interpolate from nearest active rays within hogel
                Write color_accum to the light field pixel for R
```

Layer-Based Compression Analysis

Predictable compression rates are required to create a real-time rendering and transmission system, together with down-sampling criteria (which do not indicate achievable compression rates). The following provides a compression analysis of the present disclosure's layered scene decomposition encoding strategy.

As previously described, downsampling a light field based on plenoptic sampling theory alone does not offer guaranteed compression rates. The present disclosure provides a downsampling light field encoding strategy, allowing for a low-latency, real-time light field CODEC. In one embodiment, complementary sampling schemes based on plenoptic sampling theory, using both $\Delta$EI and $N_{res}$ are employed to drive individual layered scene decomposition layer sampling rates. The layered scene decomposition, representing the total 3D scene as a plurality of light fields, expands the scene representation by a factor of the number of layers. The present disclosure further contemplates that when layer depths are chosen appropriately, compression rates can be guaranteed when combined with plenoptic sampling theory based downsampling.

For a light field $LF_{l_i}$ corresponding to a given layered scene decomposition layer the layer's restricted depth range provides a guaranteed compression rate for the layer's light field. The achievable compression ratio from downsampling a scene completely contained within a single layer can be explained in the following theorem:

Theorem 1

Consider a display $D=(M_x, M_y, N_u, f, a, D_{LP})$ with an isotropic directional resolution $N=N_u=N_v$, a layered scene decomposition L and an associated sampling scheme $S=(M_S, R)$. Assume a layered scene decomposition layer $l_i$ with the corresponding light field $LF_{l_i}$ such that $d_{min}(l_i) < Z_{DOF}(D)$, and $M_S [LF_{l_i}]$ is selected so the distance between "1" entries is set to $\Delta$EI $(d_{min}(l_i))$ and $R(l_i)=N_{res}(d_{max}(l_i))$. The compression ratio associated with S relative to the layered scene decomposition layer $l_i$ is 1:

$$N^2 \left( \frac{d_{min}(l_i)}{d_{min}(l_i)} \right).$$

Proof 1

Consider a layered scene decomposition layer within the maximum depth of field of the display, where $$d_{min}(l_i) = \frac{Z_{DOF}}{c} \text{ and } d_{max}(l_i) = \frac{Z_{DOF}}{d}$$

for $0<c$, $d \leq Z_{DOF}$. Therefore $$c = \frac{Z_{DOF}}{d_{min}(l_i)} \text{ and } d = \frac{Z_{DOF}}{d_{max}(l_i)} \text{ and } d/c = \frac{d_{min}(l_i)}{d_{max}(l_i)}.$$

Therefore $\Delta EI(d_{min}(l_i))=N/c$ and $N_{res}(d_{max}(l_i))=N/d$.

Based on this rate of sub-sampling, the system requires every $(N/c)^{th}$ elemental image, therefore providing a compression ratio of $1:(N/c)^2$. The elemental image sub-sampling provides a $1:d^2$ compression ratio. Therefore, the total compression ratio is $1:(N/c)^2 * 1:d^2 = 1:N^2 (d/c)^2$. The compression factor term $$c_f = \frac{d_{min}(l_i)}{d_{max}(l_i)}$$

determines the compression ratio.

There may be an alternate case where $d_{min}(l_i)=Z_{DOF}$ and $(d_{max}(l_i))$ can extend to any arbitrary depth. It is known $\Delta$EI $(Z_{DOF})=N$ and $N_{res}$ attains the maximum possible value of N for all depths $d \geq Z_{DOF}$. Based on this rate of sub-sampling, the system requires every $N^{th}$ elemental image, thus providing the light field with a $1:N^2$ compression ratio. Adding additional layered scene decomposition layers beyond $Z_{DOF}$ adds redundant representational capability when representing fronto-parallel planar objects. Therefore, when creating a core encoded representation, the total scene may be optimally decomposed with the maximum depth of field in the layers.

Given the compression calculation expression for downsampling a layered scene decomposition layer, one can determine how the compression factor varies as the layer parameters vary. For a layer of a fixed width, or $d_{max}(l_i) - d_{min}(l_i) = w$ for some w, the $c_f$ term is minimized when $d_{max}(l_i) - d_{min}(l_i)$ is closest to the display plane 10. Therefore, layered scene decomposition layers located closer to the display plane 10 require a narrower width to achieve the same compression ratio as layers located further away from the display plane 10. This compression rate analysis can extend to scenes that are partitioned into multiple adjacent fronto-planar layers located in the space from the display plane 10 until the depth $Z_{DOF}$ Theorem 2

Consider a display $D=(M_x, M_y, N_u, N_v, f, \alpha, D_{LP})$ with an isotropic directional resolution $N=N_u=N_v$, a layered scene decomposition L and an associated sampling scheme $S=(M_S, R)$. Let $S_{LF}=M_xM_yN_uN_v$, denoting the number of image pixels in the light field. The compression ratio of the layered scene decomposition representation can be defined as:

$$\frac{A}{S_{LF}} = (1/N^2)\sum_{i=1}^{K}(1/c_f(i)^2) = (1/N^2)\sum_{i=1}^{K}\left(\frac{d_{max}(l_i)}{d_{min}(l_i)}\right)^2$$

Proof 2

For a given layered scene decomposition layer down-sampled with compression ratio:

$$S_{layer}(i) = \left(\frac{1}{N^2 c_f(i)^2}\right) S_{LF}$$

To calculate the compression ratio, the size of each layer in the compressed form is computed and summed, and the total compressed layer size is divided by the size of the light field. Consider a sum where the size of the compressed set of layers is:

$$A = \sum_{i=1}^{K}\left(\frac{1}{N^2 c_f(i)^2}\right) S_{LF}$$

Therefore, the compression ratio of the combined layers is:

$$\frac{A}{S_{LF}} = (1/N^2)\sum_{i=1}^{K}(1/c_f(i)^2) = (1/N^2)\sum_{i=1}^{K}\left(\frac{f + i\Delta L}{f + (i-1)\Delta L}\right)^2$$

In a system where the layered scene decomposition layers are of variable width, with $d_{min}(i)$ and $d_{max}(i)$ representing the front and back boundary depths of the $i^{th}$ layer, the compression ratio of the layered scene decomposition representation is:

$$\frac{A}{S_{LF}} = (1/N^2)\sum_{i=1}^{K}(1/c_f(i)^2) = (1/N^2)\sum_{i=1}^{K}\left(\frac{d_{max}(i)}{d_{min}(i)}\right)^2$$

The sum $\Sigma_{i=1}^{K}(1/c_f(i)^2)$ for constant layered scene decomposition layers is monotonically decreasing and tending towards 1.

Therefore, layered scene decomposition layers located closer to the display plane 10 achieve a lower compression ratio than layers of the same width located further away from the display plane 10. To maximize efficiency, layered scene decomposition layers with a narrower width are located closer to the display plane 10, and wider layered scene decomposition layers are located further away from the display surface; this placement maintains a uniform compression rate across the scene.

Number and Size of Layered Scene Decomposition Layers

To determine the number of layers and the size of layers required for the layered scene decomposition, a light field display with an $\alpha(t)=t$ identity function, is provided as an example. The consideration of this identity function is not intended to limit the scope or spirit of the present disclosure, as other functions can be utilized. The skilled technician in the field to which the invention pertains will appreciate that while the display $D=(M_x, M_y, N_u, N_v, f, \alpha, D_{LP})$ is defined with a single identity function $\alpha$, each light field planar-parameterized pinhole projector within an array of planar-parameterized pinhole projectors may have a unique identity function $\alpha$.

To losslessly represent fronto-planar surfaces (assuming no occlusions), a single layered scene decomposition layer with a front boundary located at depth $Z_{DOF}$ represents the system from $Z_{DOF}$ to infinity. Lossless compression may be defined as class of data compression algorithms that allows the original data to be perfectly reconstructed from the compressed data To generate a core representation, layered scene decomposition layers beyond the deepest layer located at the light field display's maximum depth of field are not considered, as these layers do not provide additional representative power from the core representation perspective; this applies to both the inner and outer frustum volume layer sets.

Within the region from the display plane 10 to the maximum depth of field of the display (for both the inner and outer frustum volume layer sets), the layered scene decomposition layers utilize maximum and minimum distance depths that are integer multiples of the light field display f value. Layered scene decomposition layers with a narrower width provide an improved per-layer compression ratios, thereby providing better overall scene compression ratios. However, a greater number of layers in the decomposition increases the amount of processing required for decoding, as a greater number of layers must be reconstructed and merged. The present disclosure accordingly teaches a layer distribution scheme with differential layer depths. In one embodiment, layered scene decomposition layers (and by correlation the light fields represented by said layers) with a narrower width are located closer to the display plane 10, and the layer width (i.e., the depth difference between the front and back layer boundaries) increases exponentially as the distance from the display plane 10 increases.

CODEC Encoder/Encoding

Encoding according to the present disclosure is designed to support the generation of real-time interactive content (for example, for gaming or simulation environments) as well as existing multi-dimensional datasets captured through light field generalized pinhole cameras or camera arrays.

For a light field display D, a layered scene decomposition L, and a sampling scheme S, the system encoder produces the elemental images associated with the light fields corresponding to each layered scene decomposition layer included in the sampling scheme. Each elemental image corresponds to a generalized pinhole camera. The elemental images are sampled at the resolution specified by the sampling scheme and each elemental image includes a depth map.

Achieving rendering performance to drive real-time interactive content to multi-dimensional display with a significantly high resolution and size presented significant challenges overcome with the application of a hybrid or combination rendering approach to resolve the deficiencies of relying solely on any one technique as described herein.

When given identity function α, the set of generalized pinhole cameras specified by the encoding scheme for a given layered scene decomposition layer can be systematically rendered using standard graphics viewport rendering. This rendering method results in a high number of draw calls, particularly for layered scene decomposition layers with sampling schemes including large numbers of the underlying elemental images. Therefore, in a system utilizing layered scene decomposition for realistic, autostereoscopic light field displays, this rendering method alone does not provide real-time performance.

A rendering technique utilizing standard graphics draw calls restricts the rendering of a generalized pinhole camera's planar parameterizations (identity function α) to perspective transformations. Hardware-optimized rasterization functions provide the performance required for high-quality real-time rendering in traditional two-dimensional displays. These accelerated hardware functions are based on planar parameterizations. Alternatively, parallel oblique projections can utilize standard rasterized graphics pipelines to render generalized pinhole camera planar parameterizations.

The present disclosure contemplates the application of rasterization to render the generalized pinhole camera views by converting sets of triangles into pixels on the display screen. When rendering large numbers of views, every triangle must be rasterized in every view; oblique rendering reduces the number of rendering passes required for each layered scene decomposition layer and can accommodate any arbitrary identity function α. The system utilizes one parallel oblique projection per angle specified by the identity function α. Once the data is rendered, the system executes a "slice and dice" block transform (see U.S. Pat. Nos. 6,549,308 and 7,436,537) to re-group the stored data from its by-angle grouping into an elemental image grouping. The "slice and dice" method alone is inefficient for real-time interactive content requiring many separate oblique rendering draw calls when a large number of angles are to be rendered.

An arbitrary identity function α can also be accommodated by a ray-tracing rendering system. In ray tracing, specifying arbitrary angles does not require higher performance than accepting planar parameterizations. However, for real-time interactive content requiring rendering systems utilizing the latest accelerated GPUs, rasterization provides more reliable performance scalability than ray tracing rendering systems.

The present disclosure provides several hybrid rendering approaches to efficiently encode a light field. In one embodiment, encoding schemes render layered scene decomposition layers located closer to the display plane 10, with more images requiring less angular samples, and layers located further away from the display plane 10, with less images and more angular samples. In a related embodiment, perspective rendering, oblique rendering, and ray tracing are combined to render layered scene decomposition layers; these rendering techniques can be implemented in a variety of interleaved rendering methods.

According to the generalized, illustrative embodiment of the disclosure, one or more light fields are encoded by a GPU rendering an array of two-dimensional pinhole cameras. The rendered representation is created by computing the pixels from the sampling scheme applied to each of the layered scene decomposition layers. A pixel shader performs the encoding algorithm. Typical GPUs are optimized to produce a maximum of 2 to 4 pinhole camera views per scene in one transmission frame. The present disclosure requires rendering hundreds or thousands of pinhole camera views simultaneously, thus multiple rendering techniques are employed to render data more efficiently.

In one optimized approach, the generalized pinhole cameras in the layered scene decomposition layers located further away from the display plane 10 are rendered using standard graphics pipeline viewport operations, known as perspective rendering. The generalized pinhole cameras in the layered scene decomposition layers located closer to the display plane 10 are rendered using the "slice and dice" block transform. Combining these methods provides high efficiency rendering for layered plenoptic sampling theory sampling schemes. The present disclosure provides layered scene decomposition layers wherein layers located further away from the display plane 10 contain a smaller number of elemental images with a higher resolution and layers located closer to the display plane 10 contain a greater number of elemental images with a lower resolution. Rendering the smaller number of elemental images in the layers further away from the display plane 10 with perspective rendering is efficient, as the method requires only a single draw call for each elemental image. However, at some point, perspective rendering becomes or is inefficient for layers located closer to the display plane 10, as these layers contain a greater number of elemental images, requiring an increased number of draw calls. Since elemental images located in layers located closer to the display plane 10 correspond to a relatively small number of angles, oblique rendering can efficiently render these elemental images with a reduced number of draw calls. In one embodiment a process to determine where the system should utilize perspective rendering, oblique rendering, or ray tracing to render the layered scene decomposition layers is provided, Applying a threshold algorithm, each layered scene decomposition layer is evaluated to compare the number of elemental images to be rendered (i.e., the number of perspective rendering draw calls) to the size of the elemental images required at the particular layer depth (i.e., the number of oblique rendering draw calls), and the system implements the rendering method (technique) requiring the least number of rendering draw calls.

Where standard graphics calls cannot be utilized, the system can implement ray tracing instead of perspective or oblique rendering. Accordingly, in another embodiment, an alternative rendering method renders layers located closer to the display plane 10, or a portion of the layers located closer to the display plane 10, using ray tracing.

In ray-tracing rendering systems, each pixel in a layered scene decomposition layer is associated with a light ray defined by the light field. Each ray is cast and the intersection with the layered scene decomposition is computed as per standard ray tracing methodologies. Ray tracing is advantageous when rendering an identity function α which does not adhere to the standard planar parameterizations expected by the standard GPU rendering pipeline, as ray tracing can accommodate the arbitrary ray angles that are challenging for traditional GPU rendering.

The skilled technician in the field to which the invention pertains will appreciate that there are multiple rendering methods and combinations of rendering methods that can successfully encode the layered scene decomposition elemental images. Other rendering methods may provide efficiency in different contexts, dependent upon the system's underlying computational architecture, the utilized sampling scheme, and the identity function α of the light field display.

CODEC Decoder/Decoding

Decoding according to the present disclosure is designed to exploit the encoding strategy (sampling and rendering). The core representation as a set of layered light fields from a downsampled layered scene decomposition is decoded to reconstruct the light fields $LF^O$ and $LF^P$. Consider a display $D=(M_x, M_y, N_u, N_v, f, \alpha, D_{LP})$ with a layered scene decomposition $L=(K_1, K_2, L^O, L^P)$ and an associated sampling scheme $S=(M_S, R)$. The elemental images are decoded by reconstructing the light fields $LF^O$ and $LF^P$ from deconstructed $LF^O$ and $LF^P$ light fields downsampled as specified by sampling scheme S. The pixels align such that the inner and outer frustum volume layers located closer to the display plane 10 are reviewed first, moving to inner and outer frustum volume layers located further away from the display plane 10 until a non-empty pixel is located, and the data from the non-empty pixel is transmitted to the empty pixel closer to the display plane 10. In an alternative embodiment, particular implementations may restrict viewing to the inner frustum volume 18 or the outer frustum volume 20 of the light field display, thereby requiring the decoding of one of $LF^O$ or $LF^P$.

In one embodiment, a decoding process is represented by the following pseudocode:

| Core Layered Decoding: |
| --- |
| for each $l_i \in L^O$: |
| ReconLF($LF_{l_i}$, $D_m[LF_{l_i}]$, S) |
| $LF^O = LF_{l_i} *_m LF_{l_{i-1}}$ // or $LF_{l_i} *_m LF_{l_{i+1}}$ (front-back vs. back-front) |

A similar procedure reconstructs $LF^P$. Each layered scene decomposition layer is reconstructed from the limited samples defined by the given sampling scheme S. Each of the inner frustum volume layers or the outer frustum volume layers are merged to reproduce $LF^O$ or $LF^P$.

ReconLF can be executed in various forms with varying computational and post-CODEC image quality properties. ReconLF may be defined as a function, such that, given a light field associated with a layer that has been sampled according to given sampling scheme S, and the corresponding depth map for the light field, it reconstructs the full light field that has been sampled. The ReconLF input is the subset of $LF_{l_i}$ data defined by the given sampling scheme S and the corresponding downsampled depth map $D_m[LF_{l_i}]$. Depth-Image Based Rendering (DIBR), as described by Graziosi et al., can reconstruct the input light field. DIBR can be classified as a projection rendering method. In contrast to re-projection techniques, ray-casting methods, such as the screen space ray casting taught by Widmer et al., can reconstruct the light fields. Ray casting enables greater flexibility than re-projection but increases computational resource requirements.

In the DIBR approach, elemental images specified in the sampling scheme S are used as reference "views" to synthesize the missing elemental images from the light field. As described by Vincent Jantet in "Layered Depth Images for Multi-View Coding" and by Graziosi et al., when the system uses DIBR reconstruction, the process typically includes forward warping, merging, and back projection.

Application of the back-projection technique avoids producing cracks and sampling artifacts in synthesized views such as elemental images. Back-projection assumes that the elemental image's depth map or disparity map is synthesized along with the necessary reference images required to reconstruct the target image; such synthesis usually occurs through a forward warping process. With the disparity value for each pixel in the target image, the system warps the pixel to a corresponding location in a reference image; typically, this reference image location is not aligned on the integer pixel grid, so a value from the neighboring pixel values must be interpolated. Implementations of back projection known in the art use simple linear interpolation. Linear interpolation, however, can be problematic. If the warped reference image location sits on or near an object edge boundary, the interpolated value can exhibit significant artifacts, as information from across the edge boundary is included in the interpolation operation. The synthesized image is generated with a "smeared" or blurred edge.

The present disclosure provides a back-projection technique for the interpolation substep, producing a high-quality synthesized image without smeared or blurred edges. The present disclosure introduces edge-adaptive interpolation (EAI), where the system incorporates depth map information to identify the pixels required by the interpolation operation to calculate the colour of the warped pixels in a reference image. EAI is a nonlinear interpolation procedure that adapts and preserves edges during low-pass filtering operations. Consider a display $D=(M_x, M_y, N_u, N_v, f, \alpha, D_{LP})$ with a target image $I_t(x, y)$, a reference image $I_r(x, y)$, and depth maps $D_m(I_t)$ and $D_m(I_r)$. The present disclosure utilizes the depth map $D_m(I_t)$ pinhole camera parameters (f, α, etc.) and the relative position of the display's array of planar-parameterized pinhole projectors to warp each $I_t$ pixel integer (x, y) to a real-number position $(x_w, y_w)$ in $I_r$. In the likely scenario where $(x_w, y_w)$ is not located on an integer coordinate position, a value must be reconstructed based on $I_r$ integer samples.

Linear interpolation methods known in the art reconstruct $I_r(x_w, y_w)$ from the four nearest integer coordinates located in a 2×2 pixel neighborhood. Alternate reconstruction methods use larger neighborhoods (such as 3×3 pixel neighborhoods), generating similar results with varying reconstruction quality (see Marschner et al., "An evaluation of reconstruction filters for volume rendering"). These linear interpolation methods have no knowledge of the underlying geometry of the signal. The smeared or blurred edge images occur when the reconstruction utilizes pixel neighbors belonging to different objects, separated by an edge in the images. The erroneous inclusion of colour from other objects creates ghosting artifacts. The present disclosure remedies this reconstruction issue by providing a method to weigh or omit pixel neighbors by using the depth map $D_m(I_r)$ to predict the existence of edges created when a plurality of objects overlap.

For a fixed, arbitrary coordinate $(x_r, y_r)$ in the target image $I_t(x, y)$, $d_t$ defines the location depth:

$$d_t = D_m[I_r(x_r, y_r)]$$

The target image coordinate $(x_r, y_r)$ warps to the reference image coordinate $(x_w, y^w)$.

For an m-sized neighborhood of points close to $(x_w, y_w)$, the set $N_S = \{(x_i, y_i) | 1 \leq i \leq m\}$. The weight for each of the neighbors is defined as:

$$w_i = f(d_t, D_m[I_r](x_i, y_i))$$

Where $w_i$ is a function of the depth $(x_r, y_r)$ and the depth of the neighbor of $(x_w, y_w)$ corresponding to index i. The following equation represents an effective $w_i$ for a given threshold $t_e$:

$$w_i = \{1 | d_r - D_m[I_r](x_i, y_i) | < t_e 0 | d_r - D_m[I_r](x_i, y_i) | \geq t_e$$

The threshold $t_e$ is a feature size parameter. The weight function determines how to reconstruct $I_r(x_r, y_r)$:

$$I_r(x_r, y_r) = \text{Recon}(w_1 I_r(x_1, y_1), (w_2 I_r(x_2, y_2), \ldots (w_m I_r(x_m, y_m))$$

The Recon function can be a simple modified linear interpolation, where the $w_i$ weights are incorporated with standard weighting procedures and re-normalized to maintain a total weight of 1.

The present disclosure also provides a performance-optimized decoding method for reconstructing the layered scene decomposition. Consider a display $D=(M_x, M_y, N_u, N_v, f, \alpha, D_{FP})$ with a layered scene decomposition $L=(K_1, K_2, L^O, L^P)$ and an associated sampling scheme $S=(M_S, R)$. The elemental images are decoded by reconstructing the light fields $LF^O$ and $LF^P$ from deconstructed $LF^O$ and $LF^P$ light fields downsampled as specified by sampling scheme S. As noted above, particular implementations may restrict viewing to the inner frustum volume 18 or the outer frustum volume 20 of the light field display, thereby requiring the decoding of one of $LF^O$ or $LF^P$.

$LF^O$ can be reconstructed by decoding the elemental images specified by sampling scheme S. The ReconLF method for particular layers does not include inherent constraints regarding the order that the missing pixels of the missing elemental images are to be reconstructed. It is an object of the present disclosure to reconstruct missing pixels using a method that maximizes throughput; a light field large enough for an effective light field display requires an exceptional amount of data throughput to provide content at an interactive frame rate, therefore improved reconstruction data transmission is required.

Illustrative Embodiment

The method described herein shows how to exploit redundancy of memory accesses to volume render a light field. It is presented, a concrete example of how this method may be implemented using a parallel processing framework.

Consider a layered scene decomposition, L, associated with a light field display, D. Based on the formalisms from the previously disclosed CODEC, this should be a set of layers and a sampling scheme, S. Based on the given display D, it is known the maximum depth of field of this display is maxDoF (D). It is proposed that the layered scheme be chosen in such a way that there are layers at each depth such that is an integer multiple of the focal length, f, of the display. For each of these layers at each of the "multiple of f" depths, it may be computed, the value of the function ΔEI. It is known, ΔEI (i*f)=i.

Described in the present disclosure, is the method in which layers in a single frustum, for example, the inner frustum volume 18, are used for the rendering method. In volume rendering, each thread of computation associated with a single ray computes a single instance of the volume rendering integral. The integral is discretized as an accumulation calculation that takes place in front-to-back order along the ray path. Thus, for rendering the inner frustum volume 18, it is assumed for each pixel in each hogel that a ray starts at the display plane 10 for the inner frustum volume 18 and continues until reaching the far clip plane 14 for the inner frustum volume 18. In contrast, for rendering the outer frustum, a ray starts at the near clip plane 12 and ends at the display plane 10. For any ray that starts at the near clip in the outer frustum, it continues at a corresponding ray that starts at the display plane 10 and continues to the far clip plane 14 in the inner frustum volume 18. The outer and inner frustum ray segments can be computed separately in parallel and then amended into a single final calculation via the volume rendering integral discretization in a straightforward way.

Alternatively, it is also possible that ray calculations can be performed in a back to front order in the frustums. Also, it is possible to perform back to front calculations in one frustum, then proceed to calculate front to back in the other, or vice-versa, etc. Ordering is fluid in these calculations, only constrained by the mathematical properties of the integral calculations.

Combining Layered Scene Decomposition Surface Rendering with Layered Scene Decomposition Volume Rendering Described in U.S. Pat. No. 10,432,944 is a layered scene decomposition-based approach to rendering surface-based representations at real-time rates. The benefit of this approach is that it allows for the implementation of a system that can produce large numbers of pixels required for light field at real-time rates using existing technology. It is proposed that the second stage (decoding phase) of this previously described process can be integrated with the light field volume rendering approach described in this document. The result is that a rendering system which supports both volumetric and surface representations simultaneously for real-time light field rendering can be realized, taking advantage of the cache-efficient methods embodied by both our novel surface decoding and volume rendering approaches.

For the purposes of the present disclosure, it is assumed that a layered scene decomposition for surface rendering exists. A very broad decoding method for surface-based layered scene decomposition (LSD) CODEC is described as:

| Core Layered Decoding: |
| --- |
| for each $l_i \in L^O$:<br>    ReconLF($LF_{(l_i)}, D_m[LF_{(l_i)}], S$)<br>    $LF^O = LF_{(l_i)} \cdot_m LF_{(l_{(i-1)})}$ // or $LF^O = LF_{(l_i)} \cdot_m LF_{(l_{(i+1)})}$ (front-back vs. back-front) |

It is proposed that a layered decoding process for surface-based rendering, i.e. polygonal surface-based rendering, can be combined naturally with a process for volume rendering. The basic idea is that in the above procedure, individual layers are reconstructed, then merged with adjacent layers (via the $m_*$operator). It is proposed that the composition equations for volume rendering must incorporate, in addition to the merging operator. Thus, in this more general hybrid approach, the layer combining operator becomes more general and complicated as it performs a more general function that sometimes acts as a merging operator as before and other times as a volume rendering ray accumulation function. It is proposed that this new operator be referred to as a blending operator. This operator is denoted as $*_c$.

---

Core Layered Decoding:

for each $l_i \in L^O$:
  for each hogel subset $h_s$ in $l_i$
    Cache reference images implied by
    Reconstruct surface LF associated with hogel subset (store resulting color, depth map)
    Cache voxels which intersect the slab associated with l_i and h_s
    Perform ray-accumulation for rays in the slab until
      (1) ray reaches depth value stored at same pixel in surface LF or (2) until end of the layer if surface LF depth is empty
    Composite accumulated volume color, alpha with the corresponding surface color value.
  $LF^O = LF_{(l_i)} *_c LF_{(l_{(i-1)})}$ // or $LF^O = LF_{(l_i)} *_c LF_{(l_{(i+1)})}$ (front-back vs. back-front)

---

In practice, this proposal may have potential issues. Surface layers could be fairly large (e.g., power of two scheme proposed in U.S. Pat. No. 10,244,230), thus creating a very large slab 28 that intersects with a large subset of voxels, and thus requires too much user-programmable cache to be practical. One proposal to deal with this is to subdivide surface layers into smaller layers that serve to subdivide the volume rendering part of the process into more manageable chunks. This is a practical implementation level detail driven by architectural constraints and most likely simply by the quantity of user-programmable cache that is available.

In practice, for this process to work as a piece in a real-time rendering system, this process must be parallelized for efficient execution. The following row-column method has been proposed as a good way to implement the surface reconstruction CODEC in practice, since decomposing reconstruction into a series of 1-D operations decreases pressure on cache size requirements by trading off cache size requirements for the penalty of breaking the process into multiple stages and incurring a latency penalty for buffering. This can be an acceptable trade for many practical circumstances.

Dimensional Decomposition Light Field Reconstruction
Pass 1:
for each row of elemental images in $L_i$
for each missing elemental image in the row
for each row in elemental image
  load (cache) pixels from same row in reference images
for each pixel in missing row
  reconstruct pixel from reference information and write
Pass 2:
for each column of elemental images in $L_i$
for each missing elemental image in the column
for each column in elemental image
  load (cache) reference pixels from same column
  load (cache) voxels related to slab induced by this column
for each pixel in missing column
  reconstruct pixel from reference information and write
  Perform ray-accumulation for ray associated with pixel until
    (1) ray reaches depth value stored at same pixel in surface LF or (2) until end of the layer if surface LF depth is empty
  Composite accumulated volume color, alpha with the corresponding surface color value and write All publications, patents and patent applications mentioned in this specification are indicative of the level of skill of those skilled in the art to which this invention pertains and are herein incorporated by reference. The reference to any prior art in this specification is not, and should not be taken as, an acknowledgement or any form of suggestion that such prior art forms part of the common general knowledge.

The invention being thus described, it will be obvious that the same may be varied in many ways. Such variations are not to be regarded as a departure from the scope of the invention, and all such modifications as would be obvious to one skilled in the art are intended to be included within the scope of the following claims.

REFERENCES

AGUS, M., GOBBETTI, E., GUITIAN, J. A. I., MARTON, F., and PINTORE, G. "GPU Accelerated Direct Volume Rendering on an Interactive Light Field Display". Visual Computing Group. Pula, Italy. Eurographics. 2008.

CHAI, JIN-XIANG, XIN TONG, SHING-CHOW CHAN, AND HEUNG-YEUNG SHUM. "Plenoptic Sampling"

CLARK, J., PALMER, M., and LAWRENCE, P. "A Transformation Method for the Reconstruction of Functions from Nonuniformly Spaced Samples. IEEE Transactions on Acoustics, Speech, and Signal Processing. VOL. ASSP-33. No, 4. October 1985.

GANTER, D., ALAIN, M., HARDMAN, D., SMOLIC, A., and MANZKE, M. "Light-Field DVR on GPU for Streaming Time-Varying Data". GV2. Trinity College. Dublin, Ireland. Pacific Graphics. 2018.

GORTLER, STEVEN J., RADEK GRZESZCZUK, RICHARD SZELISKI, AND MICHAEL F. COHEN. "The Lumigraph" 43-52.

HALLE, M., and KROPP, A. "Fast Computer Graphics Rendering for Full Parallax Spatial Displays".

HAMILTON, M., ZHAN, L., MAYNARD, A., and BORDING, P. R. "Three Dimensional Cache Coherency for Multicore Volume Rendering". Proceedings of the Seventeenth Annual IEEE Newfoundland Electrical and Computer Engineering Conference (NECEC). 2007.

HAMILTON, M. "Real-Time Time-Warped Multiscale Signal Processing for Scientific Visualization". PhD Dissertation, Department of Computing Science, University of Alberta. 2013.

IKITS, M., KNISS J., LEFOHN A., and HANSEN C. Chapter 39, Volume Rendering Techniques. Edited by Randima Fernando. Addison Wesley.

JANTET, VINCENT. "Layered Depth Images for Multi-View Coding" Multimedia. pp. 1-135. Universite Rennes 1, 2012. English.

LEVOY, MARC, AND PAT HANRAHAN. "Light Field Rendering" SIGGRAPH. pp. 1-12.

LOCHMANN, G., REINERT, B., BUCHACHER, A., and RITSCHEL, T. "Real-time Novel-view Synthesis for Volume Rendering Using a Piece-analytic Representation". Vision, Modeling, and Visualization. 2016.

MARTIN, S., BRUTON, S., GANTER, D., and MANZKE, M. "Using a Depth Heuristic for Light Field Volume Rendering". Trinity College. Dublin, Ireland. 2012.

MARTIN, S. "View Synthesis in Light Field Volume Rendering Using Convolutional Neural Networks". Trinity College. Dublin, Ireland. August 2018.

STEGMAIER, S., STRENGERT, M., KLEIN, T., and ERTL, T. "A Simple and Flexible Volume Rendering Framework for Graphics-Hardware-based Raycasting". Institute for Visualization and Interactive Systems. University of Stuttgart. Volume Graphics. 2005.

ZWICKER, M., W. MATUSIK, F. DURAND, H. PFISTER. "Antialiasing for Automultiscopic 3D Displays" Eurographics Symposium on Rendering. 2006.

I claim:

1. A method for light field volume rendering of a scene in a computer system comprising:
    partitioning a three-dimensional description of a scene containing volume data into layers, each layer having an associated light field and at least one slab volume, each slab volume having an associated hogel subset such that all rays associated with the hogel subset intersect the slab volume;
    volume rendering the light field associated with each layer using the volume data contained within each layer such that volume rendering calculations are performed for rays in the hogel subset to provide rendered light fields and the rays in each hogel subset are synchronized as the rays in the hogel subset intersect the slab volume;
    caching the volume data intersecting the corresponding slab volume and storing the volume data in a local store cache memory; and
    blending the rendered light fields associated with each layer into a single output light field image.

2. The method of claim 1, wherein only a fraction of the volume data is cached.

3. The method of claim 1, further comprising synchronizing the volume rendering calculations performed for rays in the hogel subset at their initial entrance into the slab.

4. The method of claim 1, wherein at least one layer has more than one slab volume.

5. The method of claim 1, wherein reconstruction calculations are performed on the rays intersecting the slab volume, the rays intersecting the slab volume associated with re-sampling points located along the ray path by selectively accessing a set of volume elements from the local store cache memory.

6. The method of claim 1, wherein the hogel subsets are sized to take advantage of ray sample overlap in the hogels in the subset.

7. The method of claim 1, wherein the method is used in a real-time rendering system.

8. The method of claim 1, wherein partial ray calculations are performed for one or more ray segments in the hogel subset.

9. The method of claim 1, wherein the rays in each hogel subset share a common, programmable local store cache memory.

10. A system for performing accelerated volume rendering of a scene in a computer system, said system comprising:
    a system memory for storing volume data;
    a processor device operatively coupled with the system memory configured to:
        partition a three-dimensional description of a scene containing volume data into layers, each layer having an associated light field and at least one slab volume, each slab volume having an associated hogel subset such that all rays associated with the hogel subset intersect the slab volume;
        volume render the light field associated with each layer using the volume data contained within each layer such that volume rendering calculations are performed for rays in the hogel subset and volume rendering calculations for each hogel subset are synchronized as rays associated with each hogel subset intersect the slab volume to provide rendered light fields;
        cache the volumetric light field data intersecting the corresponding slab volume and storing the volumetric light field data in a local store cache memory; and
        blend the rendered light fields associated with each layer into a single output light field image.

11. The system of claim 10, wherein only a fraction of the volume data is cached.

12. The system of claim 10, wherein the system memory is further configured to synchronize the volume rendering calculations related to rays within a hogel subset.

13. The system of claim 10, wherein at least one layer has more than one slab volume.

14. The system of claim 10, wherein reconstruction calculations are performed on rays intersecting the slab volume by selectively accessing a set of volume elements from the local store cache memory.

15. The system of claim 10, wherein the hogel subsets are sized to take advantage of ray sample overlap amongst the hogels in the subset.

16. The system of claim 10 for use in a real-time rendering system.

17. The system of claim 10, wherein partial ray calculations are performed for one or more ray segments in the hogel subset.

18. The system of claim 10, wherein the rays in each hogel subset share a common, programmable local store cache memory.

* * * * *